(12) United States Patent
Kang et al.

(10) Patent No.: US 12,489,493 B2
(45) Date of Patent: Dec. 2, 2025

(54) METHOD AND APPARATUS FOR PERFORMING UPLINK TRANSMISSION AND RECEPTION IN A WIRELESS COMMUNICATION SYSTEM

(71) Applicant: LG Electronics Inc., Seoul (KR)

(72) Inventors: Jiwon Kang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 18/163,658

(22) Filed: Feb. 2, 2023

(65) Prior Publication Data
US 2023/0336221 A1    Oct. 19, 2023

(30) Foreign Application Priority Data

Apr. 19, 2022    (KR) .......................... 10-2022-0048410

(51) Int. Cl.
*H04B 7/0456*    (2017.01)
*H04B 7/06*    (2006.01)

(52) U.S. Cl.
CPC ......... *H04B 7/0456* (2013.01); *H04B 7/0628* (2013.01); *H04B 7/0639* (2013.01)

(58) Field of Classification Search
None
See application file for complete search history.

(56) References Cited

U.S. PATENT DOCUMENTS

| 2013/0163645 A1* | 6/2013 | Kuo ..................... H04B 7/0663 375/267 |
| 2020/0195319 A1* | 6/2020 | Park ..................... H04B 7/0417 |
| 2020/0287602 A1 | 9/2020 | Park et al. |
| 2020/0412421 A1 | 12/2020 | Jiang et al. |
| 2021/0111847 A1* | 4/2021 | Yang ..................... H04L 5/0023 |

(Continued)

OTHER PUBLICATIONS

Extended European Search Report in European Appln. No. 23152069.3, mailed on Aug. 28, 2023, 11 pages.

(Continued)

*Primary Examiner* — Minh Trang T Nguyen
(74) *Attorney, Agent, or Firm* — Fish & Richardson P.C.

(57) ABSTRACT

A method and apparatus for performing uplink transmission and reception in a wireless communication system are disclosed. According to an embodiment of the present disclosure, a method for performing uplink transmission in a wireless communication system may include: transmitting capability information related to a codebook subset for uplink transmission supported by the UE to a base station; receiving configuration information related to a codebook subset based on the capability information from the base station; and performing the uplink transmission based on the configuration information, and the capability information includes a first type of partial coherent codebook subset or a second type of partial coherent codebook subset, and the first type of partial coherent codebook subset includes at least one first precoding matrix having four zeros and four non-zero values per column, and the second type of partial coherent codebook subset includes at least one second precoding matrix having six zeros and two non-zero values for each column.

9 Claims, 11 Drawing Sheets

(56) References Cited

U.S. PATENT DOCUMENTS

2021/0351829 A1 11/2021 Kakishima et al.
2023/0318669 A1* 10/2023 Ly .................. H04L 5/0017
375/262

OTHER PUBLICATIONS

Ericsson, "Scheme details and capabilities for full power UL transmission," 3GPP TSG RAN WGI Meeting #98, R1-1909468, Prague, CZ, Aug. 26-30, 2019, 25 pages.

* cited by examiner

METHOD AND APPARATUS FOR PERFORMING UPLINK TRANSMISSION AND RECEPTION IN A WIRELESS COMMUNICATION SYSTEM

CROSS-REFERENCE TO RELATED APPLICATIONS

This application claims the benefit of earlier filing date and right of priority to Korean Application No. 10-2022-0048410, filed on Apr. 19, 2022, the contents of which are all hereby incorporated by reference herein in their entirety.

TECHNICAL FIELD

The present disclosure relates to a wireless communication system, and more particularly, to a method and apparatus for performing uplink transmission and reception in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical problem of the present disclosure is to provide a method and apparatus for performing uplink transmission and reception in a wireless communication system.

In addition, an additional technical problem of the present disclosure is to provide a method and apparatus for performing uplink transmission and reception based on an uplink eight Tx (transmit antenna port) codebook.

The technical problems to be achieved by the present disclosure are not limited to the above-described technical objects, and other technical problems which are not described herein will be clearly understood by those skilled in the pertinent art from the following description.

According to an embodiment of the present disclosure, a method for performing uplink transmission by a user equipment (UE) in a wireless communication system may include transmitting capability information related to a codebook subset for uplink transmission supported by the UE to a base station; receiving configuration information related to a codebook subset based on the capability information from the base station; and performing the uplink transmission based on the configuration information, and the capability information includes a first type of partial coherent codebook subset or a second type of partial coherent codebook subset, and the first type of partial coherent codebook subset includes at least one first precoding matrix having four zero and four non-zero values per column, and the second type of partial coherent codebook subset includes at least one second precoding matrix having six zeros and two non-zero values for each column.

According to an embodiment of the present disclosure, a method for performing uplink reception by a base station in a wireless communication system may include receiving capability information related to a codebook subset for uplink transmission supported by the UE from the UE; transmitting configuration information related to a codebook subset based on the capability information to the UE; and performing the uplink reception based on the configuration information, and the capability information includes a first type of partial coherent codebook subset or a second type of partial coherent codebook subset, and the first type of partial coherent codebook subset includes at least one first precoding matrix having four zeros and four non-zero values per column, and the second type of partial coherent codebook subset includes at least one second precoding matrix having six zeros and two non-zero values for each column.

According to an embodiment of the present disclosure, a method and apparatus for performing uplink transmission and reception in a wireless communication system may be provided.

In addition, according to an embodiment of the present disclosure, a method and apparatus for performing uplink transmission and reception based on an uplink eight Tx (transmit antenna port) codebook may be provided.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
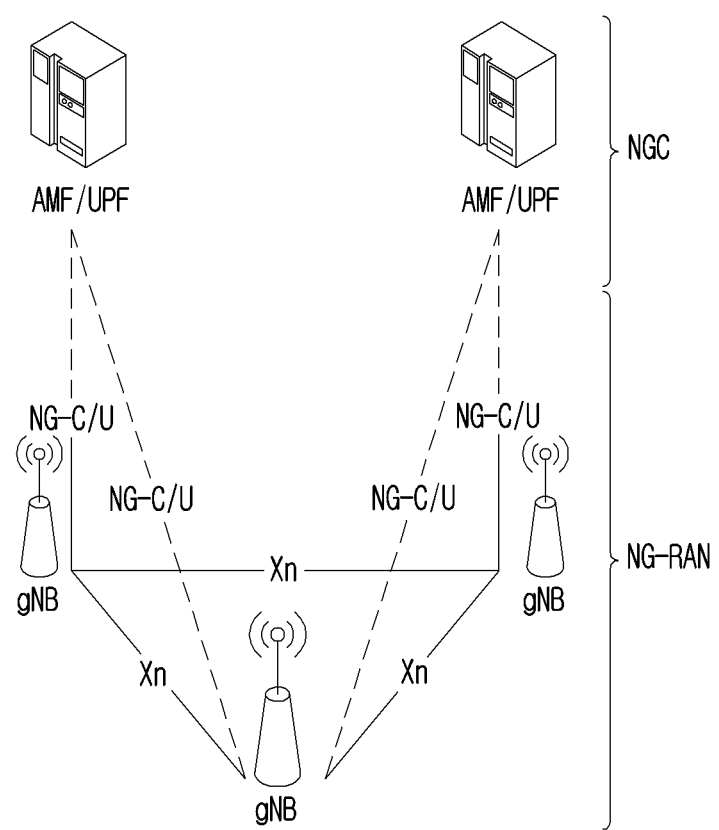
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
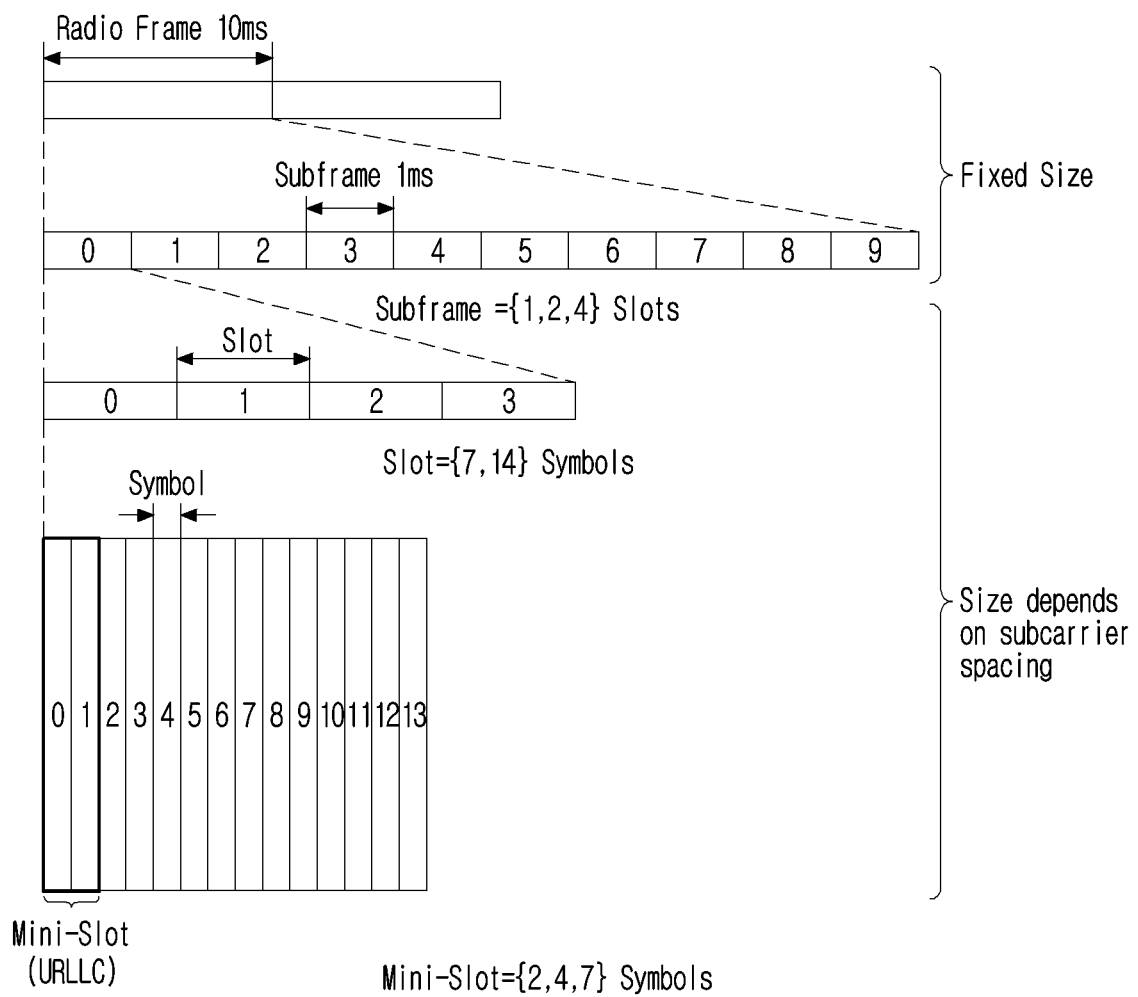
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 KHz |
| FR2 | 24250 MHz-52600 MHz | 60, 120, 240 KHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480.103 Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
| --- | --- | --- | --- |
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Figure 3:
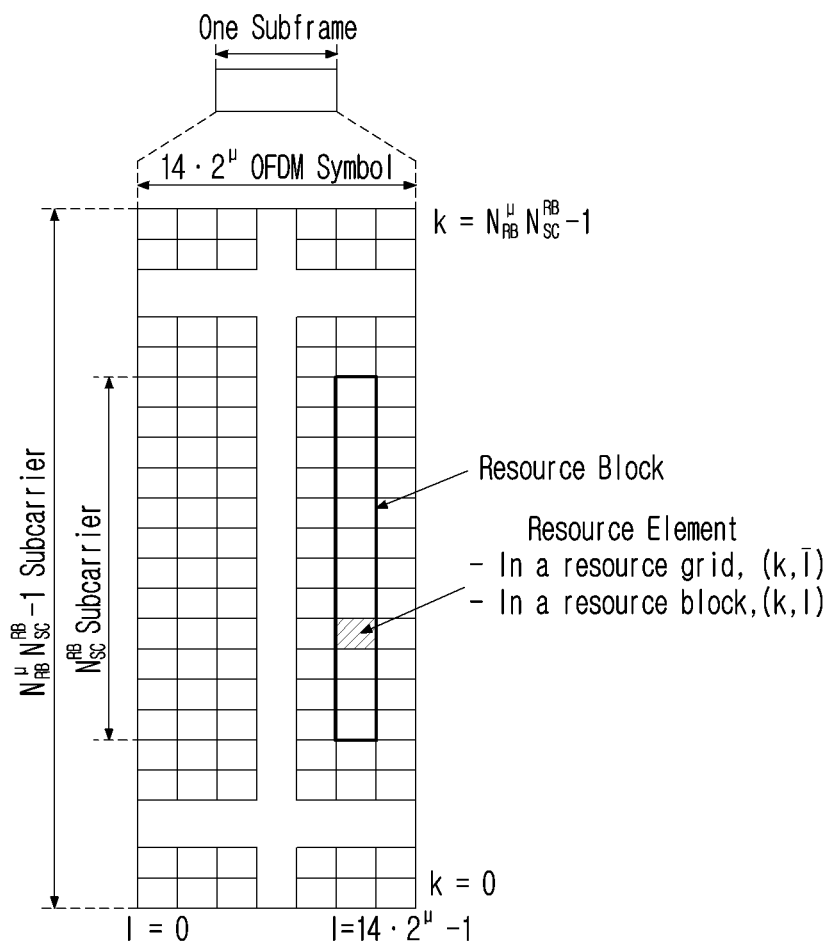
FIG. 3 illustrates a resource grid in a wireless communication system to which the present disclosure may be applied.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG. 3 illustrates a resource grid in a wireless communication system to which the present disclosure may be applied. In reference to FIG. 3, it is illustratively described that a resource grid is configured with $N_{RB}^\mu N_{sc}^{RB}$ subcarriers in a frequency domain and one subframe is configured with 14·2^μ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers.

Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, ..., $N_{RB}^\mu N_{sc}^{RB}-1$ is an index in a frequency domain and l'=0, ..., $2^\mu N_{symb}^{(\mu)}-1$ refers to a position of a symbol in a subframe. When referring to a resource element in a slot, an index pair (k,l) is used. Here, l=0, ..., $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number). Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{Equation 1}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu}$$

Equation 2

$N_{BWP,i}^{start,\mu}$ is a common resource block that a BWP starts relatively to common resource block 0.

Figure 4:
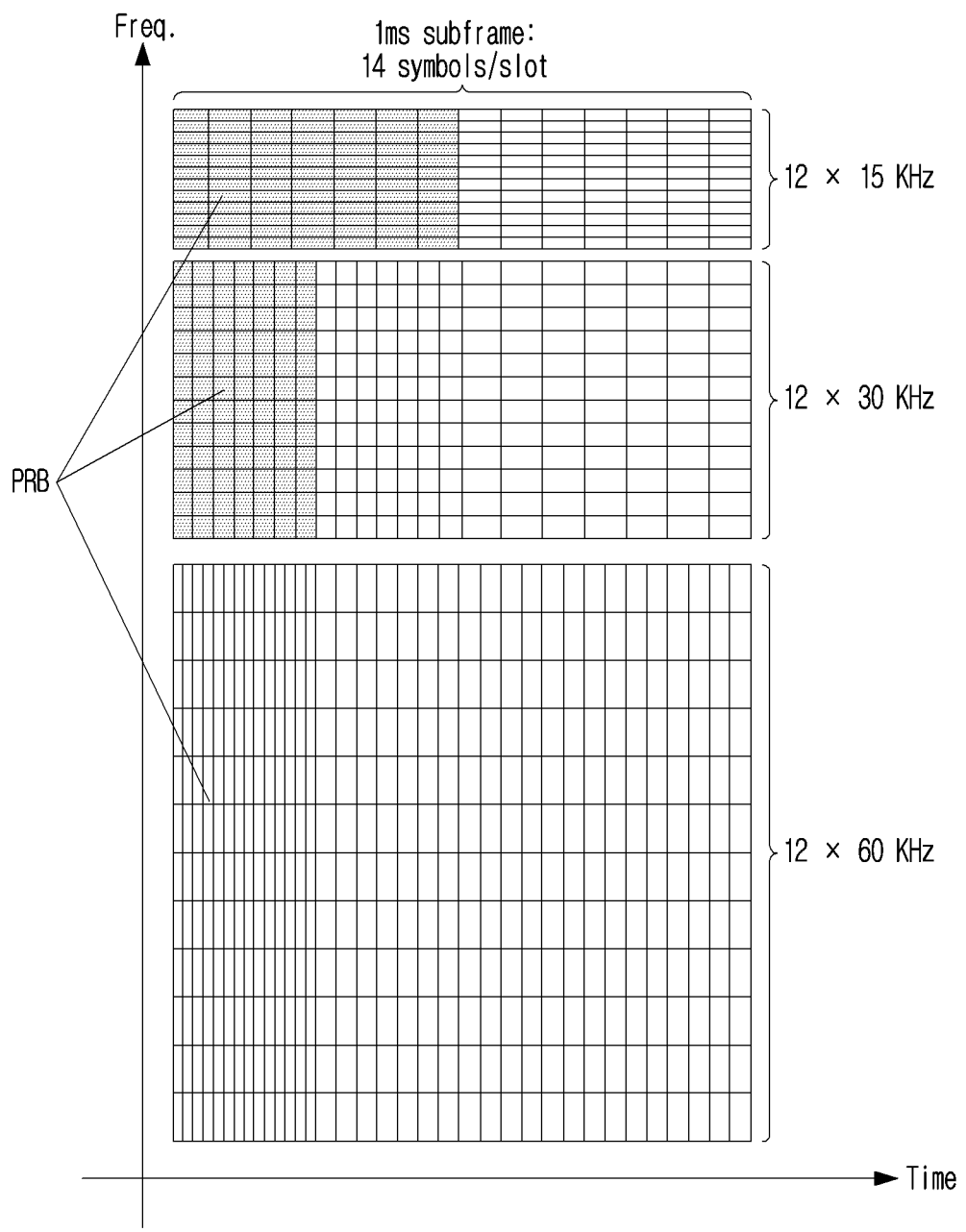
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
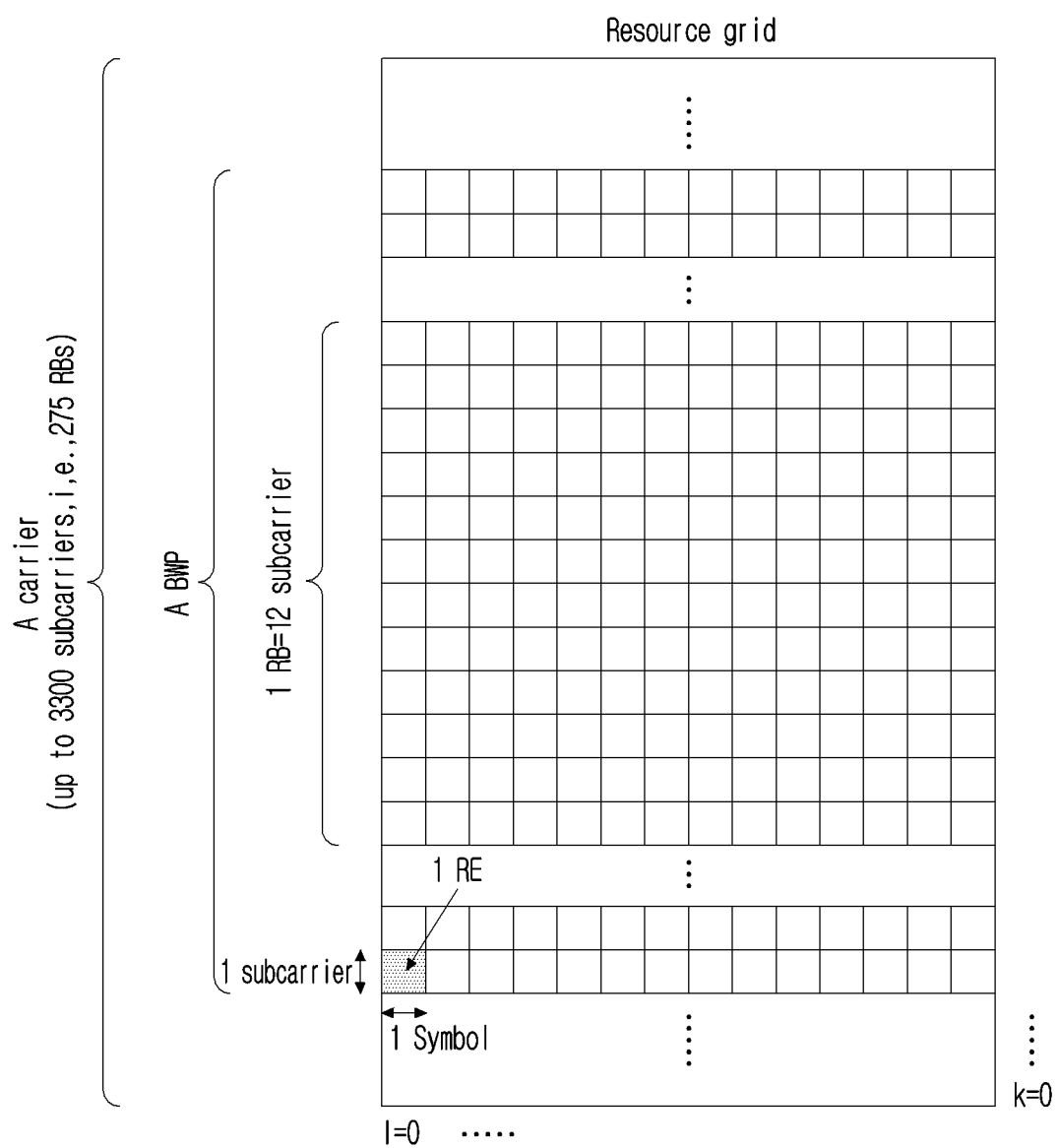
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience.

A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
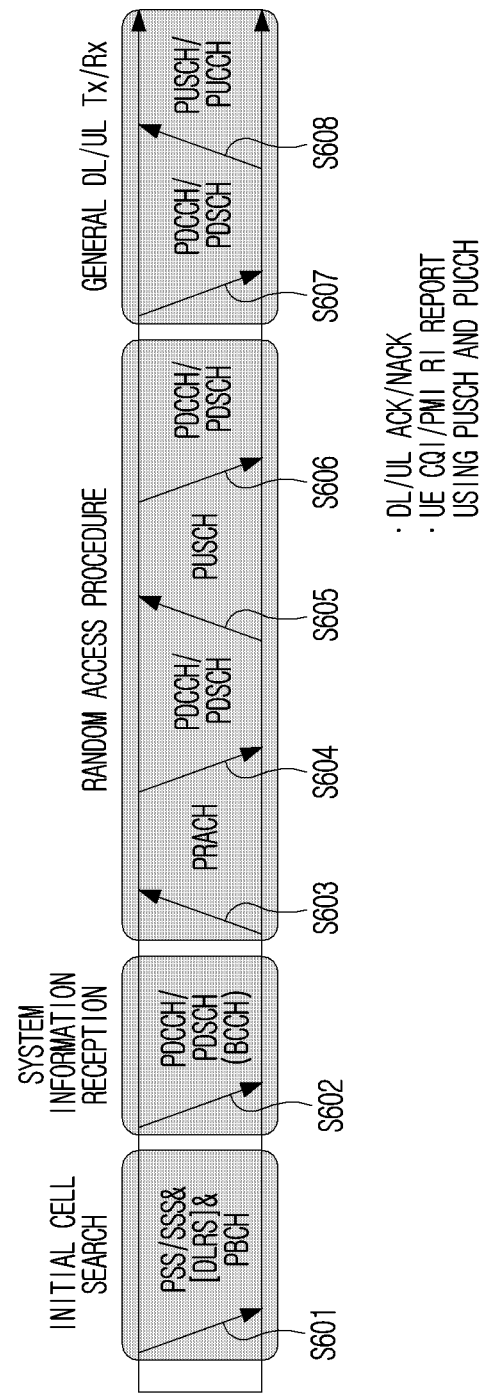
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Uplink Transmission and Reception Operation

Figure 7:
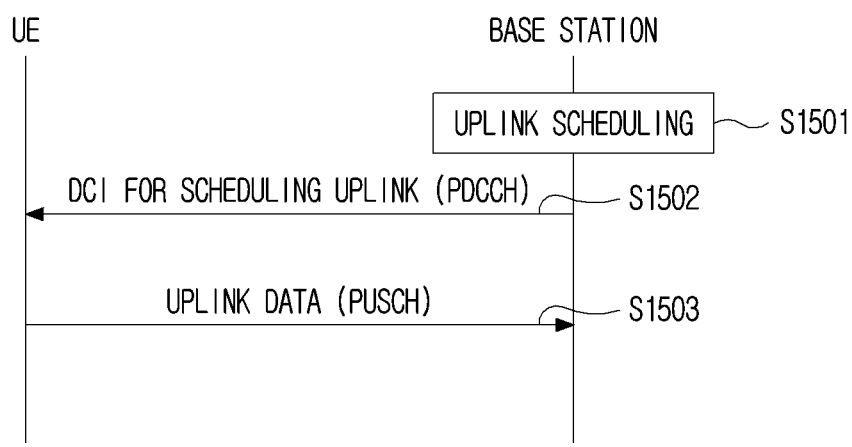
FIG. 7 illustrates an uplink transmission/reception method in a wireless communication system to which the present disclosure may be applied.

FIG. 7 is a diagram illustrating an uplink transmission/reception operation in a wireless communication system to which the present disclosure may be applied.

Referring to FIG. 7, the base station schedules uplink transmission such as frequency/time resources, transport layer, uplink precoder, and MCS (S1501). In particular, the base station may determine a beam for the terminal to transmit the PUSCH through the above-described operations.

The terminal receives DCI for uplink scheduling (i.e., including PUSCH scheduling information) from the base station on the PDCCH (S1502).

DCI format 0_0, 0_1 or 0_2 may be used for uplink scheduling, and in particular, DCI format 0_1 includes the following information: Identifier for DCI formats, UL/SUL (Supplementary uplink) UL/SUL indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, UL-SCH (Uplink Shared Channel) indicator.

In particular, SRS resources configured in the SRS resource set associated with the higher layer parameter 'usage' may be indicated by the SRS resource indicator field. In addition, 'spatialRelationInfo' may be configured for each SRS resource, and its value may be one of {CRI, SSB, SRI}.

The terminal transmits uplink data to the base station on the PUSCH (S1503).

When the terminal detects a PDCCH including DCI formats 0_0, 0_1, or 0_2, the corresponding PUSCH is transmitted according to an indication by the corresponding DCI.

For PUSCH transmission, two transmission schemes are supported: codebook-based transmission and non-codebook-based transmission:

i) When the higher layer parameter 'txConfig' is configured to 'codebook', the terminal is configured for codebook-based transmission. On the other hand, when the higher layer parameter 'txConfig' is configured to 'nonCodebook', the terminal is configured for non-codebook based transmission. If the higher layer parameter 'txConfig' is not configured, the terminal does not expect to be scheduled by DCI format 0_1. When PUSCH is scheduled by DCI format 0_0, PUSCH transmission is based on a single antenna port.

In the case of codebook-based transmission, PUSCH may be scheduled in DCI format 0_0, DCI format 0_1, DCI format 0_2, or semi-statically. If this PUSCH is scheduled by DCI format 0_1, as given by the SRS resource indicator field and Precoding information and number of layers field, the terminal determines the PUSCH transmission precoder based on SRI, TPMI (Transmit Precoding Matrix Indicator) and transmission rank from DCI. TPMI is used to indicate a precoder to be applied across antenna ports, and corresponds to an SRS resource selected by SRI when multiple SRS resources are configured.

Alternatively, if a single SRS resource is configured, TPMI is used to indicate a precoder to be applied across antenna ports and corresponds to the single SRS resource. A transmission precoder is selected from an uplink codebook having the same number of antenna ports as the upper layer parameter 'nrofSRS-Ports'. When the higher layer in which the terminal is configured to 'codebook' is configured to the parameter 'txConfig', the terminal is configured with at least one SRS resource. The SRI indicated in slot n is associated with the most recent transmission of the SRS resource identified by the SRI, where the SRS resource precedes the PDCCH carrying the SRI (i.e., slot n).

ii) In case of non-codebook based transmission, PUSCH may be scheduled in DCI format 0_0, DCI format 0_1 or semi-statically. When multiple SRS resources are configured, the terminal may determine the PUSCH precoder and transmission rank based on the wideband SRI. Here, SRI is given by the SRS resource indicator in DCI or by the higher layer parameter 'srs-ResourceIndicator'. The terminal uses one or multiple SRS resources for SRS transmission, Here, the number of SRS resources may be configured for simultaneous transmission within the same RB based on UE capability. Only one SRS port is configured for each SRS resource. Only one SRS resource may be configured with the higher layer parameter 'usage' configured to 'nonCodebook'. The maximum number of SRS resources that can be configured for non-codebook based uplink transmission is 4. The SRI indicated in slot n is associated with the most recent transmission of the SRS resource identified by the SRI, where the SRS transmission precedes the PDCCH carrying the SRI (i.e., slot n).

Codebook Configuration When Codebook-Based UL Transmission

In codebook-based UL transmission, the UL codebook may be determined by the number of SRS ports (for CB use) and the number of UL layers (i.e., transmission rank or/and number of UL DMRS ports).

Specifically, the block $([y^{(0)}(i) \ldots y^{(v-1)}(i)]^T)$ $(i=0, 1, \ldots, M_{symb}^{layer}-1)$ of the vector (s) may be precoded as shown in Equation 3.

$$\begin{bmatrix} z^{(p_0)}(i) \\ \vdots \\ z^{(p_{\rho-1})}(i) \end{bmatrix} = W \begin{bmatrix} y^{(0)}(i) \\ \vdots \\ y^{(v-1)}(i) \end{bmatrix}, \quad \text{Equation 3}$$

where $i = 0, 1, \ldots, M_{symb}^{ap} - 1$ and $M_{symb}^{ap} = M_{symb}^{layer}$ In the case of non-codebook based transmission, the precoding matrix W may be the same as the identity matrix.

In the case of codebook-based transmission, the precoding matrix W may be given as W=1 for single-layer transmission on a single antenna port. Otherwise, it may be given as shown in Tables 6 to 12 having a TPMI index or higher layer parameters obtained from DCI scheduling UL transmission. When the higher layer parameter 'txConfig' is not configured, the precoding matrix W may be 1.

Table 6 shows a precoding matrix W for single layer transmission when using two antenna ports.

TABLE 6

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 7 shows a precoding matrix W for single layer transmission using 4 antenna ports with transform precoding enabled.

TABLE 7

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 8 shows a precoding matrix W for single layer transmission using 4 antenna ports in which transform precoding is disabled.

TABLE 8

| TPMI index | W (ordered from left to right in increasing order of TPMI index) | | | | | | | |
|---|---|---|---|---|---|---|---|---|
| 0-7 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ | $\frac{1}{2}\begin{bmatrix}1\\1\\1\\1\end{bmatrix}$ | $\frac{1}{2}\begin{bmatrix}1\\1\\j\\j\end{bmatrix}$ | $\frac{1}{2}\begin{bmatrix}1\\1\\-1\\-1\end{bmatrix}$ | $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ | $\frac{1}{2}\begin{bmatrix}1\\j\\j\\-1\end{bmatrix}$ | $\frac{1}{2}\begin{bmatrix}1\\j\\-1\\-j\end{bmatrix}$ | $\frac{1}{2}\begin{bmatrix}1\\j\\-j\\1\end{bmatrix}$ | $\frac{1}{2}\begin{bmatrix}1\\-1\\1\\-1\end{bmatrix}$ | $\frac{1}{2}\begin{bmatrix}1\\-1\\j\\-j\end{bmatrix}$ | $\frac{1}{2}\begin{bmatrix}1\\-1\\-1\\1\end{bmatrix}$ | $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ | $\frac{1}{2}\begin{bmatrix}1\\-j\\j\\1\end{bmatrix}$ | $\frac{1}{2}\begin{bmatrix}1\\-j\\-1\\j\end{bmatrix}$ | $\frac{1}{2}\begin{bmatrix}1\\-j\\-j\\-1\end{bmatrix}$ | — | — | — | — |

Table 9 shows a precoding matrix W for two-layer transmission using two antenna ports in which transform precoding is disabled.

TABLE 9

| TPMI index | W (ordered from left to right in increasing order of TPMI index) | | |
|---|---|---|---|
| 0-2 | $\frac{1}{\sqrt{2}}\begin{bmatrix}1 & 0\\0 & 1\end{bmatrix}$ | $\frac{1}{2}\begin{bmatrix}1 & 1\\1 & -1\end{bmatrix}$ | $\frac{1}{2}\begin{bmatrix}1 & 1\\j & -j\end{bmatrix}$ |

Table 10 shows a precoding matrix W for two-layer transmission using four antenna ports in which transform precoding is disabled.

TABLE 10

| TPMI index | W (ordered from left to right in increasing order of TPMI index) | | | |
|---|---|---|---|---|
| 0-3 | $\frac{1}{2}\begin{bmatrix}1 & 0\\0 & 1\\0 & 0\\0 & 0\end{bmatrix}$ | $\frac{1}{2}\begin{bmatrix}1 & 0\\0 & 0\\0 & 1\\0 & 0\end{bmatrix}$ | $\frac{1}{2}\begin{bmatrix}1 & 0\\0 & 0\\0 & 0\\0 & 1\end{bmatrix}$ | $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ | $\frac{1}{2}\begin{bmatrix}0 & 0\\0 & 0\\1 & 0\\0 & 1\end{bmatrix}$ | $\frac{1}{2}\begin{bmatrix}1 & 0\\0 & 1\\1 & 0\\0 & -j\end{bmatrix}$ | $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ | $\frac{1}{2}\begin{bmatrix}1 & 0\\0 & 1\\-j & 0\\0 & -1\end{bmatrix}$ | $\frac{1}{2}\begin{bmatrix}1 & 0\\0 & 1\\-1 & 0\\0 & -j\end{bmatrix}$ | $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ | $\frac{1}{2}\begin{bmatrix}1 & 0\\0 & 1\\j & 0\\0 & -1\end{bmatrix}$ | $\frac{1}{2\sqrt{2}}\begin{bmatrix}1 & 1\\1 & 1\\1 & -1\\1 & -1\end{bmatrix}$ | $\frac{1}{2\sqrt{2}}\begin{bmatrix}1 & 1\\1 & 1\\j & -j\\j & -j\end{bmatrix}$ |

TABLE 10-continued

| TPMI index | W (ordered from left to right in increasing order of TPMI index) | | | |
|---|---|---|---|---|
| 16-19 | $\frac{1}{2\sqrt{2}}\begin{bmatrix}1 & 1\\ j & j\\ 1 & -1\\ j & -j\end{bmatrix}$ | $\frac{1}{2\sqrt{2}}\begin{bmatrix}1 & 1\\ j & j\\ j & -j\\ -1 & 1\end{bmatrix}$ | $\frac{1}{2\sqrt{2}}\begin{bmatrix}1 & 1\\ -1 & -1\\ 1 & -1\\ -1 & 1\end{bmatrix}$ | $\frac{1}{2\sqrt{2}}\begin{bmatrix}1 & 1\\ -1 & -1\\ j & -j\\ -j & j\end{bmatrix}$ |
| 20-21 | $\frac{1}{2\sqrt{2}}\begin{bmatrix}1 & 1\\ -j & -j\\ 1 & -1\\ -j & j\end{bmatrix}$ | $\frac{1}{2\sqrt{2}}\begin{bmatrix}1 & 1\\ -j & -j\\ j & -j\\ 1 & -1\end{bmatrix}$ | — | — |

Table 11 shows a precoding matrix W for 3 layer transmission using 4 antenna ports in which transform precoding is disabled.

TABLE 11

| TPMI index | W (ordered from left to right in increasing order of TPMI index) | | | |
|---|---|---|---|---|
| 0-3 | $\frac{1}{2}\begin{bmatrix}1 & 0 & 0\\ 0 & 1 & 0\\ 0 & 0 & 1\\ 0 & 0 & 0\end{bmatrix}$ | $\frac{1}{2}\begin{bmatrix}1 & 0 & 0\\ 0 & 1 & 0\\ 1 & 0 & 0\\ 0 & 0 & 1\end{bmatrix}$ | $\frac{1}{2}\begin{bmatrix}1 & 0 & 0\\ 0 & 1 & 0\\ -1 & 0 & 0\\ 0 & 0 & 1\end{bmatrix}$ | $\frac{1}{2\sqrt{3}}\begin{bmatrix}1 & 1 & 1\\ 1 & -1 & 1\\ 1 & 1 & -1\\ 1 & -1 & -1\end{bmatrix}$ |
| 4-6 | $\frac{1}{2\sqrt{3}}\begin{bmatrix}1 & 1 & 1\\ 1 & -1 & 1\\ j & j & -j\\ j & -j & -j\end{bmatrix}$ | $\frac{1}{2\sqrt{3}}\begin{bmatrix}1 & 1 & 1\\ -1 & 1 & -1\\ 1 & 1 & -1\\ -1 & 1 & 1\end{bmatrix}$ | $\frac{1}{2\sqrt{3}}\begin{bmatrix}1 & 1 & 1\\ -1 & 1 & -1\\ j & j & -j\\ -j & j & j\end{bmatrix}$ | — |

Table 12 shows a precoding matrix W for 4-layer transmission using 4 antenna ports in which transform precoding is disabled.

TABLE 12

| TPMI index | W (ordered from left to right in increasing order of TPMI index) | | | |
|---|---|---|---|---|
| 0-3 | $\frac{1}{2}\begin{bmatrix}1 & 0 & 0 & 0\\ 0 & 1 & 0 & 0\\ 0 & 0 & 1 & 0\\ 0 & 0 & 0 & 1\end{bmatrix}$ | $\frac{1}{2\sqrt{2}}\begin{bmatrix}1 & 1 & 0 & 0\\ 0 & 0 & 1 & 1\\ 1 & -1 & 0 & 0\\ 0 & 0 & 1 & -1\end{bmatrix}$ | $\frac{1}{2\sqrt{2}}\begin{bmatrix}1 & 1 & 0 & 0\\ 0 & 0 & 1 & 1\\ j & -j & 0 & 0\\ 0 & 0 & j & -j\end{bmatrix}$ | $\frac{1}{4}\begin{bmatrix}1 & 1 & 1 & 1\\ 1 & -1 & 1 & -1\\ 1 & 1 & -1 & -1\\ 1 & -1 & -1 & 1\end{bmatrix}$ |
| 4 | $\frac{1}{4}\begin{bmatrix}1 & 1 & 1 & 1\\ 1 & -1 & 1 & -1\\ j & j & -j & -j\\ j & -j & -j & j\end{bmatrix}$ | — | — | — |

Precoding matrices constituting the 4 Tx codebook may be classified into non-coherent, partially coherent, and full coherent matrices.

For a terminal having difficulty maintaining coherency between antenna ports, a non-coherent matrix means a matrix in which each layer is transmitted through one antenna port.

For example, the non-coherent matrix corresponds to TPMI indexes 0 to 3 in Table 8 corresponding to rank 1 transmission. As another example, the non-coherent matrix corresponds to TPMI indexes 0 to 5 in Table 10 corresponding to rank 2 transmission.

For a terminal in which coherency is maintained between some antenna ports (i.e., between ports in an antenna port group) but coherency is difficult to be maintained between some antenna ports (i.e., between ports with different antenna port groups), a partial coherent matrix is a matrix in which one layer is transmitted through a plurality of antenna ports corresponding to the same antenna port group, but is not transmitted through different antenna port groups.

For example, the partial coherent matrix corresponds to TPMI indexes 4 to 11 in Table 8 corresponding to rank 1 transmission. As another example, the partial coherent matrix corresponds to TPMI indices 6 to 13 in Table 8 corresponding to rank 2 transmission. Here, the first port and the third port may be configured as one group, and the second port and the fourth port may be configured as another group.

The full coherent matrix is a matrix in which coherency is maintained for all antenna ports so that one layer is transmitted to all antenna ports. For example, TPMI indexes 12 to 27 in Table 8 corresponding to rank 1 transmission. For example, TPMI indexes 14 to 21 in Table 8 corresponding to rank 2 transmission.

As described above, a terminal capable of supporting a full coherent matrix may maintain coherency for all antenna ports. Accordingly, even when a partial coherent matrix or a non-coherent matrix is instructed, the terminal may perform UL transmission based on the corresponding precoding matrix.

As another example, when a full coherent matrix is indicated for a terminal whose coherency is maintained/secured only between some antenna ports, the terminal may not be able to perform UL transmission with normal performance. However, when a non-coherent matrix is indicated for the corresponding terminal, the terminal may perform UL transmission with normal performance.

As another example, a terminal having difficulty maintaining/obtaining coherency for all antenna ports will normally support only a non-coherent matrix.

Accordingly, the terminal may transmit UE capability information indicating whether coherency for at least one antenna port can be maintained/secured to the eNB.

For example, the corresponding UE capability information may be classified into 'fullyAndPartialAndNonCoherent UE', 'partialAndNonCoherent UE', and 'nonCoherent UE'. 'fullyAndPartialAndNonCoherent UE' indicates that the terminal may normally support all TPMIs, 'partialAndNonCoherent UE' indicates that the corresponding terminal may normally support partial coherent TPMI and non-coherent TPMI, and 'nonCoherent UE' may indicate that the corresponding terminal may normally support non-coherent TPMI.

The base station may configure one of three types of codebook subset restrictions to the terminal based on the corresponding UE capability information. The three types of codebook subset restrictions may include 'fullyAndPartialAndNonCoherent', 'partialAndNonCoherent', and 'nonCoherent'.

'fullyAndPartialAndNonCoherent' indicates that all TPMIs can be used, 'partialAndNonCoherent' indicates that only partial coherent TPMI and non-coherent TPMI can be used, and 'nonCoherent' indicates that only non-coherent TPMI can be used.

In the case of a 2 Tx codebook, partial coherent TPMI does not exist, so the terminal may not be configured to 'partialAndNonCoherent' due to codebook subset restrictions.

Here, in the case of full power mode 1 (ul-FullPowerTransmission=fullpowerMode1), the above-described codebook subset restriction method may be changed. For example, a terminal that has transmitted 'partialAndNonCoherent UE' and 'nonCoherent UE' may not be able to use some antenna ports at a lower transmission rank (i.e., turn off the antenna).

Accordingly, since there may be a problem with uplink coverage, a full power mode may be additionally defined. For example, the base station may indicate partial coherent TPMI as well as non-coherent TPMI to a non-coherent terminal supporting full power mode 1. Similarly, the base station may also indicate partial full coherent TPMI to partialAndNonCoherent terminals supporting full power mode 1.

For example, when full power mode 1 and 'partialAndNonCoherent' are configured, the terminal may use partial coherent TPMI, non-coherent TPMI, and partial full coherent TPMI. In addition, when full power mode 1 and 'nonCoherent' are configured, the terminal may use non-coherent TPMI and partial/full coherent TPMI.

When the corresponding TPMI is instructed/used according to the above method, a combining error due to unstable coherency may occur. However, the coverage gain obtained by using more antenna ports may be greater than the performance deterioration due to this.

Additionally, the following TPMIs have been added for the 2 Tx and 4 Tx codebook subset restrictions.

For 2-port nonCoherent, (rank=1, TPMI=2) may be added.

For 4-port nonCoherent, (rank=1, TPMI=13), (rank=2, TPMI=6), and (rank=3, TPMI=1) may be added.

For 4-port partialAndNonCoherent, (rank=1, TPMI=12, 13, 14, 15) may be added.

8 Tx Codebook Construction Method

As described above, the UL MIMO codebook may consist of full coherent TPMI, partial coherent TPMI, and non-coherent TPMI, and based on this, three levels of UE capabilities (i.e., 'fullyAndPartialAndNonCoherent UE', 'partialAndNonCoherent UE', and 'nonCoherent UE') may be defined. And, a codebook subset restriction (CBSR) method related to the corresponding UE capability may be defined.

The CBSR scheme may be divided into three stages: 'fullyAndPartialAndNonCoherent', partialAndNonCoherent', and 'nonCoherent'. If 'fullyAndPartialAndNonCoherent' is configured for the terminal, the terminal can use all TPMIs. When 'partialAndNonCoherent' is configured for the terminal, the terminal can use partial coherent TPMI and non-coherent TPMI. If 'nonCoherent' is configured for the terminal, the terminal can use only non-coherent TPMI.

At this time, when full power mode 1 is applied, even if 'partialAndNonCoherent' is configured for the terminal, the terminal may use some full coherent TPMI. And, when full power mode 1 is applied, even when 'nonCoherent' is configured for the terminal, the terminal may use some full coherent and/or non-coherent TPMI.

And, as described above, partial coherent TPMI may be defined/designed in consideration of a UE capable of coherent transmission between some antenna ports but unable to perform coherent transmission between some other antenna ports. As a representative form of such a terminal, a multi-panel terminal may be considered.

For example, if there is a two panel terminal supporting two antenna ports per panel, an environment in which coherent transmission is valid for antenna ports in the same panel, but not valid for antenna ports belonging to different panels, that is, non-coherent transmission may be defined/configured.

Here, the environment in which coherent transmission is effective may mean an environment in which the base station may indicate to apply the phase correction coefficient measured based on the SRS to PUSCH transmission. In this case, the phase change of the corresponding antenna ports at the PUSCH DMRS transmission time point may be within a certain range when compared to the CB SRS port transmission time point.

And, an environment in which coherent transmission is not valid or only non-coherent transmission is valid is, when the base station indicates to apply the phase correction coefficient measured based on the SRS to PUSCH transmission, an environment in which coherent coupling gain due to constructive sum between MIMO paths is greatly reduced due to incorrect phase correction or there is a possibility of performance loss due to destructive sum. In this case, the phase change of the corresponding antenna ports at the time of PUSCH DMRS transmission compared to the time of transmitting the CB SRS port may be greater than a certain range.

Hereinafter, a UL codebook and related TPMI/SRI improvement schemes for supporting 8 Tx UL transmission will be described.

It may be assumed that a terminal performing UL transmission based on the 8 Tx UL codebook has a different multi-panel. For example, a terminal may have two 4-port panels (assumption 1), and a terminal may have four 2-port panels (assumption 2). In addition to the above assumption, the terminal may have two 2-port panels and one 4-port panel.

If the UL codebook design method in the basic wireless communication system is simply extended to an 8 Tx codebook, only partial coherent related UE capabilities and related CBSRs that are standardized for various terminal implementations may be defined.

That is, when designing an 8 Tx codebook/TPMI, various forms of partial coherent TPMI/matrix may be considered according to the terminal antenna port configuration. At this time, it may be difficult to effectively support various terminal implementations with UE capabilities and CBSRs classified/defined into three levels (or types) in the basic wireless communication system.

Hereinafter, a method for supporting codebook-based UL transmission for various 8 Tx terminal implementations will be described.

Figure 8:
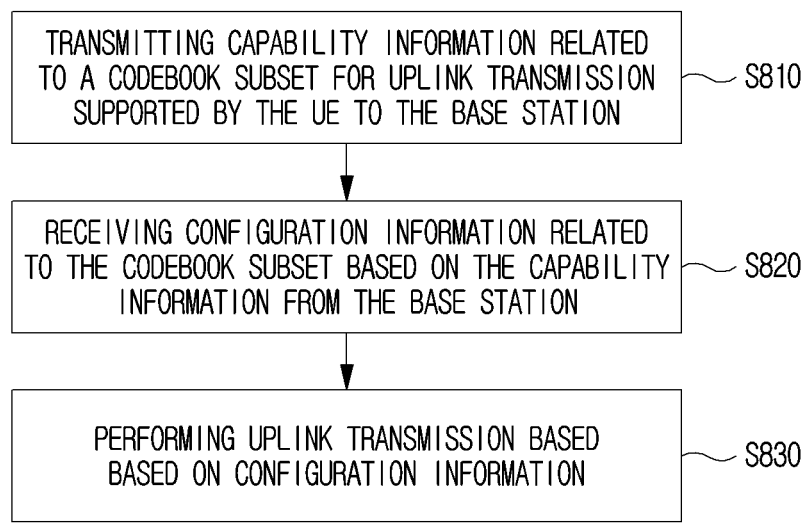
FIG. 8 is a flowchart illustrating a method of performing uplink transmission by a user equipment (UE) according to an embodiment of the present disclosure.

FIG. 8 is a flowchart illustrating a method of performing uplink transmission by a user equipment (UE)(or terminal) according to an embodiment of the present disclosure. In describing the present disclosure, uplink transmission may include at least one of a physical uplink shared channel (PUSCH) or a physical uplink control channel (PUCCH).

The UE may transmit capability information related to a codebook subset for uplink transmission supported by the UE to the base station (S810).

Specifically, the UE may have two 4-port panels (assumption 1) or four 2-port panels (assumption 2). As another example, the UE may have two 2-port panels and one 4-port panel.

At this time, the UE may transmit capability information related to a UL codebook subset for UL precoding for uplink transmission supported by the UE to the base station. For example, the capability information may include one of a full coherent codebook subset, a first type of a partially coherent codebook subset, a second type of a partially coherent codebook subset, and a non-coherent codebook subset.

In addition, the first type of the partially coherent codebook subset may include at least one first precoding matrix having four zeros and four non-zero values per column. The second type of the partially coherent codebook subset may include at least one second precoding matrix having six zeros and two non-zero values per column. The non-coherent codebook subset may include at least one third precoding matrix, and each of at least one column of the at least one third precoding matrix may consist of seven zeros and one non-zero value.

However, this is only an example, the first type of the partial coherent codebook subset may include at least one first precoding matrix having four zeros and four non-zero values per row. The second type of the partially coherent codebook subset may include at least one second precoding matrix having six zeros and two non-zero values per row. The non-coherent codebook subset may include at least one third precoding matrix, and each of the at least one row of the at least one third precoding matrix may consist of seven zeros and one non-zero value.

Examples of the configuration of each type of precoding matrix described above will be described in Embodiment 1, Embodiment 1-1, Embodiment 1-2, and Embodiment 1-3 below.

As an example, based on the capability information including the first type of the partial coherent codebook subset, at least one first precoding matrix and at least one second precoding matrix for uplink transmission may be supported by a UE.

As another example, based on the capability information including the first type of the partially coherent codebook subset, at least one first precoding matrix, at least one second precoding matrix, and at least one third precoding matrix for uplink transmission may be supported by a UE.

That is, when the UE supports the first type of the partial coherent codebook subset, precoding matrices related to the subsets other than the full coherent codebook subset may be supported for uplink transmission.

Based on the capability information including the second type of partial coherent codebook subset, at least one second precoding matrix may be supported by the UE for uplink transmission.

As another example, based on the capability information including the second type of partially coherent codebook subset, at least one second precoding matrix and at least one third precoding matrix for uplink transmission may be supported by the UE.

That is, when the UE supports the second type of partially coherent codebook subset, precoding matrices related to the subsets other than the full coherent codebook subset and the first type of the partial coherent codebook subset may be supported for uplink transmission.

The UE may receive configuration information related to the codebook subset based on the capability information from the base station (S820).

As an example, based on the capability information including the first type of partial coherent codebook subset, the configuration information may include information related to uplink transmission (e.g., 'partialAndNonCoherent_level1') based on at least one of the first type of the partial coherent codebook subset or the second type of partial coherent codebook subset.

As another example, based on the capability information including the first type of partially coherent codebook subset, the configuration information may include information related to uplink transmission (e.g., 'partialAndNonCoherent_level1') based on at least one of the first type of partial coherent codebook subset, the second type of partial coherent codebook subset, or the third type of partial coherent codebook subset.

As an example, based on the capability information including the second type of partially coherent codebook subset, the configuration information may include information related to uplink transmission (e.g., 'partialAndNonCoherent_level2') based on the second-type partial coherent codebook subset.

As another example, based on the capability information including the second type of partially coherent codebook subset, the configuration information may include information related to uplink transmission (e.g., 'partialAndNonCoherent_level2') based on at least one of the second type partial coherent codebook subset and non-coherent codebook subset.

The UE may perform uplink transmission based on configuration information (S830).

For example, the UE may receive downlink control information (DCI) from the base station. The UE may perform uplink transmission based on DCI and configuration information.

Specifically, the DCI may include information (e.g., precoding information and number of layers field) indicating an index of a specific precoding matrix among at least one first precoding matrix, at least one second precoding matrix, and at least one third precoding matrix. The UE may configure/determine a precoder based on the index of a specific precoding matrix indicated by the DCI, and perform uplink transmission through the determined precoder.

Another example of the present disclosure, based on a specific full power transmission mode being configured for the UE, the UE may perform uplink transmission based on at least one first precoding matrix, at least one second precoding matrix, at least one third precoding matrix, or at least one fourth precoding matrix.

In this case, the first type of partially coherent codebook subset or the second type of partially coherent codebook subset may include at least one fourth precoding matrix.

Embodiment 1

Embodiment 1 relates to a method for defining a type of multi-level/partial coherency for an 8 Tx UL codebook and defining UE capability, TPMI/precoding matrix, and CB SR based thereon.

Specifically, embodiment 1 relates to a method of including TPMI(s)/matrix(s) that can be supported for assumptions 1 (e.g., if the terminal has two 4-port panels) and assumption 2 (e.g., if the terminal has four 2-port panels), respectively, in an 8 Tx codebook.

For example, based on assumption 1, TPMI/precoding matrices in which each column corresponding to a layer has four non-zero values and four zero values may be defined. For convenience of description of the present disclosure, a TPMI/precoding matrix in which each column corresponding to each layer has four non-zero values and four zero values is referred to as partial coherent level 1 TPMI.

Table 13 illustrates a partial coherent level 1 TPMI/precoding matrix with rank 1.

TABLE 13

$$\frac{1}{2\sqrt{2}}\begin{bmatrix}1\\0\\1\\0\\1\\0\\1\\0\end{bmatrix} \quad \frac{1}{2\sqrt{2}}\begin{bmatrix}1\\0\\-1\\0\\1\\0\\-1\\0\end{bmatrix} \quad \frac{1}{2\sqrt{2}}\begin{bmatrix}1\\0\\1\\0\\-1\\0\\-1\\0\end{bmatrix} \quad \frac{1}{2\sqrt{2}}\begin{bmatrix}1\\0\\-1\\0\\-1\\0\\1\\0\end{bmatrix} \quad \frac{1}{2\sqrt{2}}\begin{bmatrix}0\\1\\0\\1\\0\\1\\0\\1\end{bmatrix} \quad \frac{1}{2\sqrt{2}}\begin{bmatrix}0\\1\\0\\-1\\0\\1\\0\\-1\end{bmatrix} \quad \frac{1}{2\sqrt{2}}\begin{bmatrix}0\\1\\0\\1\\0\\-1\\0\\-1\end{bmatrix} \quad \frac{1}{2\sqrt{2}}\begin{bmatrix}0\\1\\0\\-1\\0\\-1\\0\\1\end{bmatrix}$$

That is, when a specific full power transmission mode is configured for the terminal, at least one fourth precoding matrix composed of non-zero values may be included in the first type of partial coherent codebook subset or the second type of partial coherent codebook subset.

In this case, each of at least one column (or row) of the at least one fourth precoding matrix may have eight non-zero values.

Figure 9:
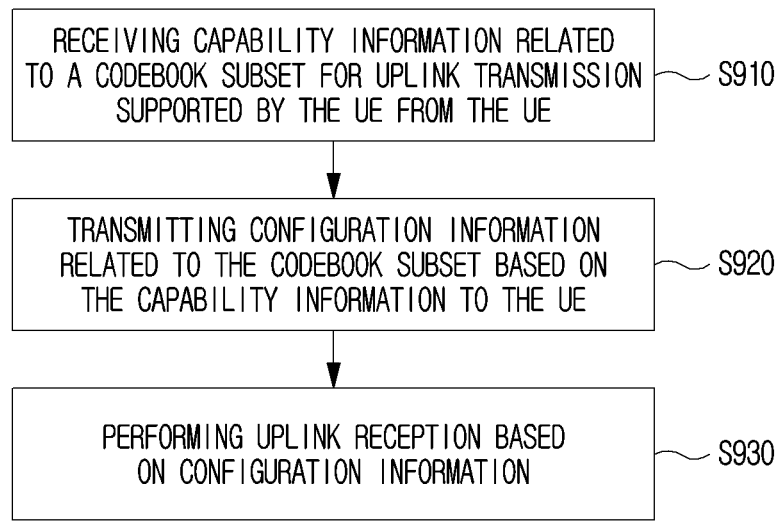
FIG. 9 is a flowchart illustrating a method of performing uplink reception by a base station according to an embodiment of the present disclosure.

FIG. 9 is a flowchart illustrating a method of performing uplink reception by a base station according to an embodiment of the present disclosure.

The base station may receive capability information related to a codebook subset for uplink transmission supported by the UE from the UE (S910).

The UE may transmit configuration information related to the codebook subset to the UE based on the capability information (S920).

Capability information and configuration information related to codebook subsets have been specifically described with reference to FIG. 8, so duplicate descriptions will be omitted.

The base station may perform uplink reception based on configuration information (S930).

Specifically, the base station may transmit DCI including information indicating an index of a specific precoding matrix among at least one first precoding matrix, at least one second precoding matrix, or a third precoding matrix to the UE. The base station may perform uplink reception based on information indicating an index of a specific precoding matrix and configuration information.

Hereinafter, a method for supporting codebook-based UL transmission for eight Tx UE implementation will be described in more detail.

In Table 13, the first 4 matrices may be transmitted using the first 4 Tx panel (based on the left side), and the remaining 4 matrices may be transmitted using the second 4 Tx panel. Table 13 is only an example, and rank 1 partial coherent level 1 TPMI having four zero values and four non-zero values can be implemented.

Table 14 illustrates a partial coherent level 1 TPMI/precoding matrix with rank 2.

TABLE 14

$$\frac{1}{2\sqrt{2}}\begin{bmatrix}x1 & 0\\0 & y1\\x2 & 0\\0 & y2\\x3 & 0\\0 & y3\\x4 & 0\\0 & y4\end{bmatrix} \quad \frac{1}{4}\begin{bmatrix}x1 & y1\\0 & 0\\x2 & y2\\0 & 0\\x3 & y3\\0 & 0\\x4 & y4\\0 & 0\end{bmatrix} \quad \frac{1}{4}\begin{bmatrix}0 & 0\\x1 & y1\\0 & 0\\x2 & y2\\0 & 0\\x3 & y3\\0 & 0\\x4 & y4\end{bmatrix}$$

In Table 14, the first layer of the first matrix may be transmitted through the first 4-Tx panel, and the second layer of the first matrix may be transmitted through the second 4-Tx panel. Both layers of the second matrix may be transmitted through the first 4 Tx panel, and both layers of the third matrix may be transmitted through the second 4 Tx panel.

In addition, x1, x2, x3, x4, y1, y2, y3, and y4 are non-zero values of size 1, and the vector [x1 x2 x3 x4] and the vector [y1 y2 y3 y4] may have an orthogonal relationship.

In the above examples, it is assumed that the first 4 Tx precoding matrix (or 4 port groups with coherency) uses the 1st, 3rd, 5th, and 7th ports and the second 4Tx matrix (or 4 port group with coherency) uses 2nd, 4th, 6th, and 8th ports.

When each matrix or port indices maintaining port coherency (hereinafter referred to as a port coherency group) is changed, the positions of zero and non-zero values of the matrix may be changed.

For example, when the port coherency group is divided into a group consisting of 1st, 2nd, 5th, and 6th ports and a group consisting of 3rd, 4th, 7th, and 8th ports, the positions of zero and non-zero values of the matrix (i.e., partial coherent level 1 TPMI/precoding matrix) may be configured as shown in Table 15.

TABLE 15

Rank 1

$$\frac{1}{2\sqrt{2}}\begin{bmatrix} x1 \\ x2 \\ 0 \\ 0 \\ x3 \\ x4 \\ 0 \\ 0 \end{bmatrix} \quad \frac{1}{2\sqrt{2}}\begin{bmatrix} 0 \\ 0 \\ x1 \\ x2 \\ 0 \\ 0 \\ x3 \\ x4 \end{bmatrix}$$

TABLE 16

$$\frac{1}{2\sqrt{2}}\begin{bmatrix} x1 \\ 0 \\ 0 \\ 0 \\ x2 \\ 0 \\ 0 \\ 0 \end{bmatrix} \quad \frac{1}{2\sqrt{2}}\begin{bmatrix} 0 \\ x1 \\ 0 \\ 0 \\ 0 \\ x2 \\ 0 \\ 0 \end{bmatrix} \quad \frac{1}{2\sqrt{2}}\begin{bmatrix} 0 \\ 0 \\ x1 \\ 0 \\ 0 \\ 0 \\ x2 \\ 0 \end{bmatrix} \quad \frac{1}{2\sqrt{2}}\begin{bmatrix} 0 \\ 0 \\ 0 \\ x1 \\ 0 \\ 0 \\ 0 \\ x2 \end{bmatrix}$$

In Table 16, x1, x2, y1, and y2 are non-zero values of size 1, and the vector [x1 x2] and the vector [y1 y2] may have an orthogonal relationship.

Table 16 assumes that the n (n=1, 2, 3, 4)-th matrix transmits the corresponding PUSCH in the n-th 2 Tx panel. In addition, it may be assumed that the m-th port and the m+4-th port correspond to one 2Tx panel (port coherency group). As described in Partial coherent level 1, when the port coherency group is changed, the positions of zero and non-zero values of each matrix may be changed.

Table 17 illustrates a partial coherent level 2 TPMI/precoding matrix with rank 2.

TABLE 17

$$\frac{1}{2\sqrt{2}}\begin{bmatrix} x1 & 0 \\ 0 & y1 \\ 0 & 0 \\ 0 & 0 \\ x2 & 0 \\ 0 & y2 \\ 0 & 0 \\ 0 & 0 \end{bmatrix} \quad \frac{1}{2\sqrt{2}}\begin{bmatrix} x1 & 0 \\ 0 & 0 \\ 0 & y1 \\ 0 & 0 \\ x2 & 0 \\ 0 & 0 \\ 0 & y2 \\ 0 & 0 \end{bmatrix} \quad \frac{1}{2\sqrt{2}}\begin{bmatrix} x1 & 0 \\ 0 & 0 \\ 0 & 0 \\ 0 & y1 \\ x2 & 0 \\ 0 & 0 \\ 0 & 0 \\ 0 & y2 \end{bmatrix} \quad \frac{1}{4}\begin{bmatrix} x1 & y1 \\ 0 & 0 \\ 0 & 0 \\ 0 & 0 \\ x2 & y2 \\ 0 & 0 \\ 0 & 0 \\ 0 & 0 \end{bmatrix} \quad \frac{1}{4}\begin{bmatrix} 0 & 0 \\ x1 & y1 \\ 0 & 0 \\ 0 & 0 \\ 0 & 0 \\ x2 & y2 \\ 0 & 0 \\ 0 & 0 \end{bmatrix} \quad \frac{1}{4}\begin{bmatrix} 0 & 0 \\ 0 & 0 \\ x1 & y1 \\ 0 & 0 \\ 0 & 0 \\ 0 & 0 \\ x2 & y2 \\ 0 & 0 \end{bmatrix} \quad \frac{1}{4}\begin{bmatrix} 0 & 0 \\ 0 & 0 \\ 0 & 0 \\ x1 & y1 \\ 0 & 0 \\ 0 & 0 \\ 0 & 0 \\ x2 & y2 \end{bmatrix}$$

TABLE 15-continued

Rank 2

$$\frac{1}{2\sqrt{2}}\begin{bmatrix} x1 & 0 \\ x2 & 0 \\ 0 & y1 \\ 0 & y2 \\ x3 & 0 \\ x4 & 0 \\ 0 & y3 \\ 0 & y4 \end{bmatrix} \quad \frac{1}{4}\begin{bmatrix} x1 & y1 \\ x2 & y2 \\ 0 & 0 \\ 0 & 0 \\ x3 & y3 \\ x4 & y4 \\ 0 & 0 \\ 0 & 0 \end{bmatrix} \quad \frac{1}{4}\begin{bmatrix} 0 & 0 \\ 0 & 0 \\ x1 & y1 \\ x2 & y2 \\ 0 & 0 \\ 0 & 0 \\ x3 & y3 \\ x4 & y4 \end{bmatrix}$$

Precoding matrices from ranks 3 to 7 corresponding to partial coherent level 1 may also be defined/designed so that each column corresponding to layer transmission consists of four non-zero values and four zero values.

Additionally or alternatively, based on assumption 2, TPMIs/matrices in which each column corresponding to each layer has two non-zero values and six zero values may be defined/configured. For convenience of description of the present disclosure, a TPMI/precoding matrix in which each column corresponding to each layer has two non-zero values and six zero values is referred to as partial coherent level 2 TPMI.

Table 16 illustrates a partial coherent level 2 TPMI/precoding matrix with rank 1.

In Table 17 (from the left), the first layer of the first matrix may be transmitted through the first 2 Tx panel, and the second layer of the first matrix may be transmitted through the second 2 Tx panel. The first layer of the second matrix may be transmitted through the first 2 Tx panel, and the second layer of the second matrix may be transmitted through the third 2 Tx panel. The first layer of the third matrix may be transmitted through the first 2-Tx panel, and the second layer of the third matrix may be transmitted through the fourth 2-Tx panel. All 2 layers of the 5th matrix can be burned through the first 2 Tx panels. Both layers of the sixth matrix may be transmitted through the third 2 Tx panel. Both layers of the seventh matrix may be transmitted through the fourth 2 Tx panel.

As described above, precoding matrices from rank 3 to rank 7 corresponding to partial coherent level 2 may also be defined/designed/configured while maintaining the feature that each column corresponding to each layer consists of two non-zero values and six zero values.

Table 18 illustrates a rank 1 codebook (for CP-OFDM and/or DFT-s-OFDM) constructed based on the above.

TABLE 18

| TPMI index | W (ordered from left to right in increasing order of TPMI index) | | | | | | | |
|---|---|---|---|---|---|---|---|---|
| 0-7 | $\frac{1}{2\sqrt{2}}\begin{bmatrix}1\\0\\0\\0\\0\\0\\0\\0\end{bmatrix}$ | $\frac{1}{2\sqrt{2}}\begin{bmatrix}0\\1\\0\\0\\0\\0\\0\\0\end{bmatrix}$ | $\frac{1}{2\sqrt{2}}\begin{bmatrix}0\\0\\1\\0\\0\\0\\0\\0\end{bmatrix}$ | $\frac{1}{2\sqrt{2}}\begin{bmatrix}0\\0\\0\\1\\0\\0\\0\\0\end{bmatrix}$ | $\frac{1}{2\sqrt{2}}\begin{bmatrix}0\\0\\0\\0\\1\\0\\0\\0\end{bmatrix}$ | $\frac{1}{2\sqrt{2}}\begin{bmatrix}0\\0\\0\\0\\0\\1\\0\\0\end{bmatrix}$ | $\frac{1}{2\sqrt{2}}\begin{bmatrix}0\\0\\0\\0\\0\\0\\1\\0\end{bmatrix}$ | $\frac{1}{2\sqrt{2}}\begin{bmatrix}0\\0\\0\\0\\0\\0\\0\\1\end{bmatrix}$ |
| 8-15 | $\frac{1}{2\sqrt{2}}\begin{bmatrix}1\\0\\0\\0\\1\\0\\0\\0\end{bmatrix}$ | $\frac{1}{2\sqrt{2}}\begin{bmatrix}1\\0\\0\\0\\-1\\0\\0\\0\end{bmatrix}$ | $\frac{1}{2\sqrt{2}}\begin{bmatrix}1\\0\\0\\0\\j\\0\\0\\0\end{bmatrix}$ | $\frac{1}{2\sqrt{2}}\begin{bmatrix}1\\0\\0\\0\\-j\\0\\0\\0\end{bmatrix}$ | $\frac{1}{2\sqrt{2}}\begin{bmatrix}0\\1\\0\\0\\0\\0\\1\\0\end{bmatrix}$ | $\frac{1}{2\sqrt{2}}\begin{bmatrix}0\\1\\0\\0\\0\\0\\-1\\0\end{bmatrix}$ | $\frac{1}{2\sqrt{2}}\begin{bmatrix}0\\1\\0\\0\\0\\0\\j\\0\end{bmatrix}$ | $\frac{1}{2\sqrt{2}}\begin{bmatrix}0\\1\\0\\0\\0\\0\\-j\\0\end{bmatrix}$ |
| 16-23 | $\frac{1}{2\sqrt{2}}\begin{bmatrix}0\\0\\1\\0\\0\\0\\1\\0\end{bmatrix}$ | $\frac{1}{2\sqrt{2}}\begin{bmatrix}0\\0\\1\\0\\0\\0\\-1\\0\end{bmatrix}$ | $\frac{1}{2\sqrt{2}}\begin{bmatrix}0\\0\\1\\0\\0\\0\\j\\0\end{bmatrix}$ | $\frac{1}{2\sqrt{2}}\begin{bmatrix}0\\0\\1\\0\\0\\0\\-j\\0\end{bmatrix}$ | $\frac{1}{2\sqrt{2}}\begin{bmatrix}0\\0\\0\\1\\0\\0\\0\\1\end{bmatrix}$ | $\frac{1}{2\sqrt{2}}\begin{bmatrix}0\\0\\0\\1\\0\\0\\0\\-1\end{bmatrix}$ | $\frac{1}{2\sqrt{2}}\begin{bmatrix}0\\0\\0\\1\\0\\0\\0\\j\end{bmatrix}$ | $\frac{1}{2\sqrt{2}}\begin{bmatrix}0\\0\\0\\1\\0\\0\\0\\-j\end{bmatrix}$ |
| 24-31 | $\frac{1}{2\sqrt{2}}\begin{bmatrix}1\\1\\0\\0\\1\\1\\0\\0\end{bmatrix}$ | $\frac{1}{2\sqrt{2}}\begin{bmatrix}1\\1\\0\\0\\j\\j\\0\\0\end{bmatrix}$ | $\frac{1}{2\sqrt{2}}\begin{bmatrix}1\\1\\0\\0\\-1\\-1\\0\\0\end{bmatrix}$ | $\frac{1}{2\sqrt{2}}\begin{bmatrix}1\\1\\0\\0\\-j\\-j\\0\\0\end{bmatrix}$ | $\frac{1}{2\sqrt{2}}\begin{bmatrix}1\\j\\0\\0\\1\\j\\0\\0\end{bmatrix}$ | $\frac{1}{2\sqrt{2}}\begin{bmatrix}1\\j\\0\\0\\j\\1\\0\\0\end{bmatrix}$ | $\frac{1}{2\sqrt{2}}\begin{bmatrix}1\\j\\0\\0\\j\\-1\\0\\0\end{bmatrix}$ | $\frac{1}{2\sqrt{2}}\begin{bmatrix}1\\j\\0\\0\\-1\\-j\\0\\0\end{bmatrix}$ |
| 32-39 | $\frac{1}{2\sqrt{2}}\begin{bmatrix}1\\-1\\0\\0\\1\\-1\\0\\0\end{bmatrix}$ | $\frac{1}{2\sqrt{2}}\begin{bmatrix}1\\-1\\0\\0\\j\\-j\\0\\0\end{bmatrix}$ | $\frac{1}{2\sqrt{2}}\begin{bmatrix}1\\-1\\0\\0\\-1\\1\\0\\0\end{bmatrix}$ | $\frac{1}{2\sqrt{2}}\begin{bmatrix}1\\-1\\0\\0\\-j\\j\\0\\0\end{bmatrix}$ | $\frac{1}{2\sqrt{2}}\begin{bmatrix}1\\-j\\0\\0\\1\\-j\\0\\0\end{bmatrix}$ | $\frac{1}{2\sqrt{2}}\begin{bmatrix}1\\-j\\0\\0\\j\\1\\0\\0\end{bmatrix}$ | $\frac{1}{2\sqrt{2}}\begin{bmatrix}1\\-j\\0\\0\\-1\\j\\0\\0\end{bmatrix}$ | $\frac{1}{2\sqrt{2}}\begin{bmatrix}1\\-j\\0\\0\\-j\\1\\0\\0\end{bmatrix}$ |
| 40-47 | $\frac{1}{2\sqrt{2}}\begin{bmatrix}0\\0\\1\\1\\0\\0\\1\\1\end{bmatrix}$ | $\frac{1}{2\sqrt{2}}\begin{bmatrix}0\\0\\1\\1\\0\\0\\j\\j\end{bmatrix}$ | $\frac{1}{2\sqrt{2}}\begin{bmatrix}0\\0\\1\\1\\0\\0\\-1\\-1\end{bmatrix}$ | $\frac{1}{2\sqrt{2}}\begin{bmatrix}0\\0\\1\\1\\0\\0\\-j\\-j\end{bmatrix}$ | $\frac{1}{2\sqrt{2}}\begin{bmatrix}0\\0\\1\\j\\0\\0\\1\\j\end{bmatrix}$ | $\frac{1}{2\sqrt{2}}\begin{bmatrix}0\\0\\1\\j\\0\\0\\j\\-1\end{bmatrix}$ | $\frac{1}{2\sqrt{2}}\begin{bmatrix}0\\0\\1\\j\\0\\0\\j\\-1\end{bmatrix}$ | $\frac{1}{2\sqrt{2}}\begin{bmatrix}0\\0\\1\\j\\0\\0\\-1\\-j\end{bmatrix}$ |
| 48-55 | $\frac{1}{2\sqrt{2}}\begin{bmatrix}0\\0\\1\\-1\\0\\0\\1\\-1\end{bmatrix}$ | $\frac{1}{2\sqrt{2}}\begin{bmatrix}0\\0\\1\\-1\\0\\0\\j\\-j\end{bmatrix}$ | $\frac{1}{2\sqrt{2}}\begin{bmatrix}0\\0\\1\\-1\\0\\0\\-1\\1\end{bmatrix}$ | $\frac{1}{2\sqrt{2}}\begin{bmatrix}0\\0\\1\\-1\\0\\0\\-j\\j\end{bmatrix}$ | $\frac{1}{2\sqrt{2}}\begin{bmatrix}0\\0\\1\\-j\\0\\0\\1\\-j\end{bmatrix}$ | $\frac{1}{2\sqrt{2}}\begin{bmatrix}0\\0\\1\\-j\\0\\0\\j\\1\end{bmatrix}$ | $\frac{1}{2\sqrt{2}}\begin{bmatrix}0\\0\\1\\-j\\0\\0\\-1\\j\end{bmatrix}$ | $\frac{1}{2\sqrt{2}}\begin{bmatrix}0\\0\\1\\-j\\0\\0\\-j\\1\end{bmatrix}$ |

TABLE 18-continued

| TPMI index | W (ordered from left to right in increasing order of TPMI index) |
|---|---|
| 56-63 | $\frac{1}{2\sqrt{2}}\begin{bmatrix}1\\1\\1\\1\\1\\1\\1\\1\end{bmatrix}$, $\frac{1}{2\sqrt{2}}\begin{bmatrix}1\\1\\1\\1\\j\\j\\j\\j\end{bmatrix}$, $\frac{1}{2\sqrt{2}}\begin{bmatrix}1\\1\\1\\-1\\-1\\-1\\-1\end{bmatrix}$, $\frac{1}{2\sqrt{2}}\begin{bmatrix}1\\1\\1\\1\\-j\\-j\\-j\\-j\end{bmatrix}$, $\frac{1}{2\sqrt{2}}\begin{bmatrix}1\\-j\\-1\\j\\1\\-j\\-1\\j\end{bmatrix}$, $\frac{1}{2\sqrt{2}}\begin{bmatrix}1\\-j\\-1\\j\\j\\1\\-j\\-1\end{bmatrix}$, $\frac{1}{2\sqrt{2}}\begin{bmatrix}1\\-j\\-1\\j\\-1\\j\\1\\-j\end{bmatrix}$, $\frac{1}{2\sqrt{2}}\begin{bmatrix}1\\-j\\-1\\j\\-j\\-1\\j\\1\end{bmatrix}$ |
| 64-71 | $\frac{1}{2\sqrt{2}}\begin{bmatrix}1\\-1\\1\\-1\\1\\-1\\1\\-1\end{bmatrix}$, $\frac{1}{2\sqrt{2}}\begin{bmatrix}1\\-1\\1\\-1\\j\\j\\j\\-j\end{bmatrix}$, $\frac{1}{2\sqrt{2}}\begin{bmatrix}1\\-1\\1\\-1\\-1\\1\\-1\\1\end{bmatrix}$, $\frac{1}{2\sqrt{2}}\begin{bmatrix}1\\-1\\1\\-1\\-j\\j\\-j\\j\end{bmatrix}$, $\frac{1}{2\sqrt{2}}\begin{bmatrix}1\\j\\-1\\-j\\1\\j\\-1\\-j\end{bmatrix}$, $\frac{1}{2\sqrt{2}}\begin{bmatrix}1\\j\\-1\\-j\\j\\-1\\-j\\1\end{bmatrix}$, $\frac{1}{2\sqrt{2}}\begin{bmatrix}1\\j\\-1\\-j\\-1\\-j\\1\\j\end{bmatrix}$, $\frac{1}{2\sqrt{2}}\begin{bmatrix}1\\j\\-1\\-j\\-j\\1\\j\\-1\end{bmatrix}$ |

In Table 18, TMPI indexes 0 to 7 may be non-coherent TPMIs, TMPI indices 8 to 23 may be partial coherent level 2 TPMIs, TMPI indices 24 to 55 may be partial coherent level 1 TPMIs, and TPMI indexes 56 to 71 may be full coherent TMPI.

Table 19 illustrates a non-coherent codebook of rank 2 constructed based on the above description. For convenience of description of the present disclosure, it is assumed that the TPMI index for each coherency level starts from 0.

TABLE 19

| TPMI index | W (ordered from left to right in increasing order of TPMI index) |
|---|---|
| 0-7 | $\frac{1}{2\sqrt{2}}\begin{bmatrix}1&0\\0&1\\0&0\\0&0\\0&0\\0&0\\0&0\\0&0\end{bmatrix}$, $\frac{1}{2\sqrt{2}}\begin{bmatrix}1&0\\0&0\\0&1\\0&0\\0&0\\0&0\\0&0\\0&0\end{bmatrix}$, $\frac{1}{2\sqrt{2}}\begin{bmatrix}1&0\\0&0\\0&0\\0&1\\0&0\\0&0\\0&0\\0&0\end{bmatrix}$, $\frac{1}{2\sqrt{2}}\begin{bmatrix}1&0\\0&0\\0&0\\0&0\\0&1\\0&0\\0&0\\0&0\end{bmatrix}$, $\frac{1}{2\sqrt{2}}\begin{bmatrix}1&0\\0&0\\0&0\\0&0\\0&0\\0&1\\0&0\\0&0\end{bmatrix}$, $\frac{1}{2\sqrt{2}}\begin{bmatrix}1&0\\0&0\\0&0\\0&0\\0&0\\0&0\\0&1\\0&0\end{bmatrix}$, $\frac{1}{2\sqrt{2}}\begin{bmatrix}1&0\\0&0\\0&0\\0&0\\0&0\\0&0\\0&0\\0&1\end{bmatrix}$, $\frac{1}{2\sqrt{2}}\begin{bmatrix}0&0\\1&0\\0&1\\0&0\\0&0\\0&0\\0&0\\0&0\end{bmatrix}$ |
| 8-15 | $\frac{1}{2\sqrt{2}}\begin{bmatrix}0&0\\1&0\\0&1\\0&0\\0&0\\0&0\\0&0\\0&0\end{bmatrix}$, $\frac{1}{2\sqrt{2}}\begin{bmatrix}0&0\\1&0\\0&0\\0&1\\0&0\\0&0\\0&0\\0&0\end{bmatrix}$, $\frac{1}{2\sqrt{2}}\begin{bmatrix}0&0\\1&0\\0&0\\0&0\\0&1\\0&0\\0&0\\0&0\end{bmatrix}$, $\frac{1}{2\sqrt{2}}\begin{bmatrix}0&0\\1&0\\0&0\\0&0\\0&0\\0&1\\0&0\\0&0\end{bmatrix}$, $\frac{1}{2\sqrt{2}}\begin{bmatrix}0&0\\1&0\\0&0\\0&0\\0&0\\0&0\\0&1\\0&0\end{bmatrix}$, $\frac{1}{2\sqrt{2}}\begin{bmatrix}0&0\\1&0\\0&0\\0&0\\0&0\\0&0\\0&0\\0&1\end{bmatrix}$, $\frac{1}{2\sqrt{2}}\begin{bmatrix}0&0\\0&0\\1&0\\0&1\\0&0\\0&0\\0&0\\0&0\end{bmatrix}$, $\frac{1}{2\sqrt{2}}\begin{bmatrix}0&0\\0&0\\1&0\\0&0\\0&1\\0&0\\0&0\\0&0\end{bmatrix}$ |
| 16-23 | $\frac{1}{2\sqrt{2}}\begin{bmatrix}0&0\\0&0\\1&0\\0&0\\0&0\\0&1\\0&0\\0&0\end{bmatrix}$, $\frac{1}{2\sqrt{2}}\begin{bmatrix}0&0\\0&0\\1&0\\0&0\\0&0\\0&0\\0&1\\0&0\end{bmatrix}$, $\frac{1}{2\sqrt{2}}\begin{bmatrix}0&0\\0&0\\1&0\\0&0\\0&0\\0&0\\0&0\\0&1\end{bmatrix}$, $\frac{1}{2\sqrt{2}}\begin{bmatrix}0&0\\0&0\\0&0\\1&0\\0&1\\0&0\\0&0\\0&0\end{bmatrix}$, $\frac{1}{2\sqrt{2}}\begin{bmatrix}0&0\\0&0\\0&0\\1&0\\0&0\\0&1\\0&0\\0&0\end{bmatrix}$, $\frac{1}{2\sqrt{2}}\begin{bmatrix}0&0\\0&0\\0&0\\1&0\\0&0\\0&0\\0&1\\0&0\end{bmatrix}$, $\frac{1}{2\sqrt{2}}\begin{bmatrix}0&0\\0&0\\0&0\\1&0\\0&0\\0&0\\0&0\\0&1\end{bmatrix}$, $\frac{1}{2\sqrt{2}}\begin{bmatrix}0&0\\0&0\\0&0\\1&0\\0&0\\0&0\\0&0\\0&1\end{bmatrix}$ |
| 24-31 | $\frac{1}{2\sqrt{2}}\begin{bmatrix}0&0\\0&0\\0&0\\0&0\\1&0\\0&1\\0&0\\0&0\end{bmatrix}$, $\frac{1}{2\sqrt{2}}\begin{bmatrix}0&0\\0&0\\0&0\\0&0\\1&0\\0&0\\0&1\\0&0\end{bmatrix}$, $\frac{1}{2\sqrt{2}}\begin{bmatrix}0&0\\0&0\\0&0\\0&0\\1&0\\0&0\\0&0\\0&1\end{bmatrix}$, $\frac{1}{2\sqrt{2}}\begin{bmatrix}0&0\\0&0\\0&0\\0&0\\0&0\\1&0\\0&1\\0&0\end{bmatrix}$, $\frac{1}{2\sqrt{2}}\begin{bmatrix}0&0\\0&0\\0&0\\0&0\\0&0\\1&0\\0&0\\0&1\end{bmatrix}$, $\frac{1}{2\sqrt{2}}\begin{bmatrix}0&0\\0&0\\0&0\\0&0\\0&0\\0&0\\1&0\\0&1\end{bmatrix}$ |

Table 20 illustrates a partial-coherent level 1 codebook of rank 2 constructed based on the above description.

TABLE 20

| TPMI index | W (ordered from left to right in increasing order of TPMI index) |
|---|---|
| 0-7 | $\frac{1}{2\sqrt{2}}\begin{bmatrix}1&0\\0&1\\0&0\\0&0\\1&0\\0&-j\\0&0\\0&0\end{bmatrix}$, $\frac{1}{2\sqrt{2}}\begin{bmatrix}1&0\\0&1\\0&0\\0&0\\1&0\\0&j\\0&0\\0&0\end{bmatrix}$, $\frac{1}{2\sqrt{2}}\begin{bmatrix}1&0\\0&1\\0&0\\0&0\\-j&0\\0&1\\0&0\\0&0\end{bmatrix}$, $\frac{1}{2\sqrt{2}}\begin{bmatrix}1&0\\0&1\\0&0\\0&0\\-j&0\\0&-1\\0&0\\0&0\end{bmatrix}$, $\frac{1}{2\sqrt{2}}\begin{bmatrix}1&0\\0&1\\0&0\\0&0\\-1&0\\0&-j\\0&0\\0&0\end{bmatrix}$, $\frac{1}{2\sqrt{2}}\begin{bmatrix}1&0\\0&1\\0&0\\0&0\\-1&0\\0&j\\0&0\\0&0\end{bmatrix}$, $\frac{1}{2\sqrt{2}}\begin{bmatrix}1&0\\0&1\\0&0\\0&0\\j&0\\0&1\\0&0\\0&0\end{bmatrix}$, $\frac{1}{2\sqrt{2}}\begin{bmatrix}1&0\\0&1\\0&0\\0&0\\j&0\\0&-1\\0&0\\0&0\end{bmatrix}$ |
| 8-15 | $\frac{1}{2\sqrt{2}}\begin{bmatrix}1&0\\0&0\\0&1\\0&0\\1&0\\0&0\\0&-j\\0&0\end{bmatrix}$, $\frac{1}{2\sqrt{2}}\begin{bmatrix}1&0\\0&0\\0&1\\0&0\\1&0\\0&0\\0&j\\0&0\end{bmatrix}$, $\frac{1}{2\sqrt{2}}\begin{bmatrix}1&0\\0&0\\0&1\\0&0\\-j&0\\0&0\\0&1\\0&0\end{bmatrix}$, $\frac{1}{2\sqrt{2}}\begin{bmatrix}1&0\\0&0\\0&1\\0&0\\-j&0\\0&0\\0&-1\\0&0\end{bmatrix}$, $\frac{1}{2\sqrt{2}}\begin{bmatrix}1&0\\0&0\\0&1\\0&0\\-1&0\\0&0\\0&-j\\0&0\end{bmatrix}$, $\frac{1}{2\sqrt{2}}\begin{bmatrix}1&0\\0&0\\0&1\\0&0\\-1&0\\0&0\\0&j\\0&0\end{bmatrix}$, $\frac{1}{2\sqrt{2}}\begin{bmatrix}1&0\\0&0\\0&1\\0&0\\j&0\\0&0\\0&1\\0&0\end{bmatrix}$, $\frac{1}{2\sqrt{2}}\begin{bmatrix}1&0\\0&0\\0&1\\0&0\\j&0\\0&0\\0&-1\\0&0\end{bmatrix}$ |
| 16-23 | $\frac{1}{2\sqrt{2}}\begin{bmatrix}1&0\\0&0\\0&0\\0&1\\1&0\\0&0\\0&0\\0&-j\end{bmatrix}$, $\frac{1}{2\sqrt{2}}\begin{bmatrix}1&0\\0&0\\0&0\\0&1\\1&0\\0&0\\0&0\\0&j\end{bmatrix}$, $\frac{1}{2\sqrt{2}}\begin{bmatrix}1&0\\0&0\\0&0\\0&1\\-j&0\\0&0\\0&0\\0&1\end{bmatrix}$, $\frac{1}{2\sqrt{2}}\begin{bmatrix}1&0\\0&0\\0&0\\0&1\\-j&0\\0&0\\0&0\\0&-1\end{bmatrix}$, $\frac{1}{2\sqrt{2}}\begin{bmatrix}1&0\\0&0\\0&0\\0&1\\-1&0\\0&0\\0&0\\0&-j\end{bmatrix}$, $\frac{1}{2\sqrt{2}}\begin{bmatrix}1&0\\0&0\\0&0\\0&1\\-1&0\\0&0\\0&0\\0&j\end{bmatrix}$, $\frac{1}{2\sqrt{2}}\begin{bmatrix}1&0\\0&0\\0&0\\0&1\\j&0\\0&0\\0&0\\0&1\end{bmatrix}$, $\frac{1}{2\sqrt{2}}\begin{bmatrix}1&0\\0&0\\0&0\\0&1\\j&0\\0&0\\0&0\\0&-1\end{bmatrix}$ |
| 24-31 | $\frac{1}{2\sqrt{2}}\begin{bmatrix}0&0\\1&0\\0&1\\0&0\\0&0\\1&0\\0&-j\\0&0\end{bmatrix}$, $\frac{1}{2\sqrt{2}}\begin{bmatrix}0&0\\1&0\\0&1\\0&0\\0&0\\1&0\\0&j\\0&0\end{bmatrix}$, $\frac{1}{2\sqrt{2}}\begin{bmatrix}0&0\\1&0\\0&1\\0&0\\0&0\\-j&0\\0&1\\0&0\end{bmatrix}$, $\frac{1}{2\sqrt{2}}\begin{bmatrix}0&0\\1&0\\0&1\\0&0\\0&0\\-j&0\\0&-1\\0&0\end{bmatrix}$, $\frac{1}{2\sqrt{2}}\begin{bmatrix}0&0\\1&0\\0&1\\0&0\\0&0\\-1&0\\0&-j\\0&0\end{bmatrix}$, $\frac{1}{2\sqrt{2}}\begin{bmatrix}0&0\\1&0\\0&1\\0&0\\0&0\\-1&0\\0&j\\0&0\end{bmatrix}$, $\frac{1}{2\sqrt{2}}\begin{bmatrix}0&0\\1&0\\0&1\\0&0\\0&0\\j&0\\0&1\\0&0\end{bmatrix}$, $\frac{1}{2\sqrt{2}}\begin{bmatrix}0&0\\1&0\\0&1\\0&0\\0&0\\j&0\\0&-1\\0&0\end{bmatrix}$ |
| 32-39 | $\frac{1}{2\sqrt{2}}\begin{bmatrix}0&0\\1&0\\0&0\\0&1\\0&0\\1&0\\0&0\\0&-j\end{bmatrix}$, $\frac{1}{2\sqrt{2}}\begin{bmatrix}0&0\\1&0\\0&0\\0&1\\0&0\\1&0\\0&0\\0&j\end{bmatrix}$, $\frac{1}{2\sqrt{2}}\begin{bmatrix}0&0\\1&0\\0&0\\0&1\\0&0\\-j&0\\0&0\\0&1\end{bmatrix}$, $\frac{1}{2\sqrt{2}}\begin{bmatrix}0&0\\1&0\\0&0\\0&1\\0&0\\-j&0\\0&0\\0&-1\end{bmatrix}$, $\frac{1}{2\sqrt{2}}\begin{bmatrix}0&0\\1&0\\0&0\\0&1\\0&0\\-1&0\\0&0\\0&-j\end{bmatrix}$, $\frac{1}{2\sqrt{2}}\begin{bmatrix}0&0\\1&0\\0&0\\0&1\\0&0\\-1&0\\0&0\\0&j\end{bmatrix}$, $\frac{1}{2\sqrt{2}}\begin{bmatrix}0&0\\1&0\\0&0\\0&1\\0&0\\j&0\\0&0\\0&1\end{bmatrix}$, $\frac{1}{2\sqrt{2}}\begin{bmatrix}0&0\\1&0\\0&0\\0&1\\0&0\\j&0\\0&0\\0&-1\end{bmatrix}$ |
| 40-47 | $\frac{1}{2\sqrt{2}}\begin{bmatrix}0&0\\0&0\\1&0\\0&1\\0&0\\0&0\\1&0\\0&-j\end{bmatrix}$, $\frac{1}{2\sqrt{2}}\begin{bmatrix}0&0\\0&0\\1&0\\0&1\\0&0\\0&0\\1&0\\0&j\end{bmatrix}$, $\frac{1}{2\sqrt{2}}\begin{bmatrix}0&0\\0&0\\1&0\\0&1\\0&0\\0&0\\-j&0\\0&1\end{bmatrix}$, $\frac{1}{2\sqrt{2}}\begin{bmatrix}0&0\\0&0\\1&0\\0&1\\0&0\\0&0\\-j&0\\0&-1\end{bmatrix}$, $\frac{1}{2\sqrt{2}}\begin{bmatrix}0&0\\0&0\\1&0\\0&1\\0&0\\0&0\\-1&0\\0&-j\end{bmatrix}$, $\frac{1}{2\sqrt{2}}\begin{bmatrix}0&0\\0&0\\1&0\\0&1\\0&0\\0&0\\-1&0\\0&j\end{bmatrix}$, $\frac{1}{2\sqrt{2}}\begin{bmatrix}0&0\\0&0\\1&0\\0&1\\0&0\\0&0\\j&0\\0&1\end{bmatrix}$, $\frac{1}{2\sqrt{2}}\begin{bmatrix}0&0\\0&0\\1&0\\0&1\\0&0\\0&0\\j&0\\0&-1\end{bmatrix}$ |

In the case of full coherent TPMI, it may be configured to combine two columns in a dimension 8 DFT matrix (or other orthogonal matrix).

As in the above-described example, when all non-coherent, partial coherent level 1, partial coherent level 2, and full coherent situations are considered, the size of the TPMI codebook becomes too large, which can burden the DCI payload size. Therefore, a codebook may be constructed with only some TPMI indexes in the above example.

As in the above example, when partial coherent level 1 and partial coherent level 2 are defined, the terminal may define/configure the following 4-step UE capability reporting instead of the 3-step UE capability reporting in the basic wireless communication system.

If partial coherent level 2 TPMI is indicated by the terminal according to Assumption 1, the terminal may group each 4 Tx panel by 2 Tx, configure and transmit. Accordingly, a terminal supporting partial coherent level 1 TPMI (e.g., a 2-panel terminal having 4 Tx per panel) may have no problem applying partial coherent level 2 TPMI.

That is, when partial coherent level 2 TPMI is indicated, only 4 Tx coherent transmission is excluded from the corresponding panel, and the terminal may select and transmit 2 Tx.

Conversely, there may be a terminal capable of supporting partial coherent level 2 TPMI but difficult to support partial coherent level 1 TPMI (e.g., a 4-panel UE having 2 Tx per panel). At this time, embodiments 1-1 to 1-4 may be applied.

Embodiment 1-1

Four levels of UE capability may be configured for 8 Tx transmission. That is, the terminal may select and transmit one of four UE capabilities for 8 Tx transmission to the BS. For example, capabilities for 8Tx transmission may be classified into 'fullyAndPartialAndNonCoherent', 'partialAndNonCoherent_level 1', 'partialAndNonCoherent_level 2', and 'nonCoherent'.

Here, a terminal that transmits 'fullyAndPartialAndNonCoherent' as a UE capability may be a terminal (e.g., a single panel terminal) that has no problem supporting all TPMIs.

A terminal that transmits 'partialAndNonCoherent_level 1' as a UE capability means a terminal (i.e., the terminal supports non-coherent TPMI, partial coherent level 1 TPMI, and partial coherent level 2 TPMI) (e.g., 2-panel terminal with 4 Tx per panel) capable of supporting the remaining TPMIs except full coherent TPMI.

A terminal that transmits 'partialAndNonCoherent_level 2' as a UE capability means a terminal (i.e., a terminal that normally supports only non-coherent TPMI and partial coherent level 2 TPMI) (e.g., a 4-panel terminal with 2 Tx per panel) that is difficult to support full coherent TPMI and partial coherent level 1 TPMI.

A terminal transmitting 'nonCoherent' as a UE capability means a terminal that normally supports only non-coherent TPMI (e.g., an 8-panel terminal having 1 Tx per panel).

Embodiment 1-2

When four levels of UE capabilities are defined, CBSR may also be defined as four levels based on the UE capabilities. For example, (when a specific full power mode is not configured), four levels of CBSR for an 8 Tx codebook may be defined.

For example, a 4-level CB SR may be defined as 'fullyAndPartialAndNonCoherent', 'partialAndNonCoherent_level 1', 'partialAndNonCoherent_level 2' and 'nonCoherent'

'fullyAndPartialAndNonCoherent' may indicate that all TPMIs can be used, 'partialAndNonCoherent_level 1' may indicate that TPMIs other than full coherent TPMI can be used, and 'partialAndNonCoherent_level 2' may indicate that TPMIs other than full coherent TPMI and partial coherent level 1 TPMI can be used. Also, 'nonCoherent' may indicate that TPMIs other than full coherent TPMI, partial coherent level 1 TPMI, and partial coherent level 2 TPMI can be used.

For example, in the CBSR scheme, it is assumed that a specific full power transmission mode (e.g., full power mode 1) is configured for the UE. At this time, some full coherent TPMI may be included for 'partialAndNonCoherent_level 1'. For 'partialAndNonCoherent_level 2', some full coherent TPMI and/or partial coherent level 1 TPMI may be included. For 'nonCoherent', some full coherent TPMI and/or partial coherent level 1 TPMI and/or partial coherent level 2 TPMI may be included.

That is, a terminal for which 'partialAndNonCoherent_level 1' is configured may use partial full coherent TPMI. A terminal for which 'partialAndNonCoherent_level 2' is configured may use some full coherent TPMI and/or partial coherent level 1 TPMI. A terminal configured with 'nonCoherent' may use some full coherent TPMI and/or partial coherent level 1 TPMI and/or partial coherent level 2 TPMI.

Each of Embodiments 1-1 and 1-2 relates to UE capabilities and CBSR based thereon when the number of partial coherency levels in Embodiment 1 is assumed to be 2. If the number of partial coherency levels is defined to exceed 2, UE capability and CBSR steps may be further subdivided.

Embodiment 1-3

Like the current NR wireless communication system, when three levels of CB SR are defined, but the CBSR is configured to 'partialAndNonCoherent', TPMI interpretation may be interlocked with UE capabilities.

For example, for an 8 Tx codebook, three levels of CBSR of a basic wireless communication system may be maintained. Here, when CBSR is configured to 'partialAndNonCoherent', TPMI matrices may be linked to related UE capabilities.

As an example, it is assumed that CBSR is configured to 'partialAndNonCoherent' (and/or when a specific full power mode is not configured). At this time, the partialAndNonCoherent_level 1 terminal may configure/interpret the codebook based on the remaining TPMIs except for the full coherent TPMI. The partialAndNonCoherent_level 2 terminal may configure/interpret the codebook based on the remaining TPMIs except for the full coherent TPMI and the partial coherent level 1 TPMI.

As described above, according to the configuration of the port coherency group, in the examples related to the precoding matrices of the present disclosure, the position of the zero value and the position of the non-zero value of each column may be changed.

That is, the configuration of ports (indexes) corresponding to each panel may be changed. The port coherency group configuration method (i.e., which ports correspond to coherent transmission for each partial coherency level, etc.) may be configured assuming a (defined/promised) port coherency group configuration such as 4Tx partial coherent TPMI.

For example, in the 4 Tx codebook configuration, the port coherency group configuration may be defined/promised that the first and third ports are composed of one port coherency group and the second and fourth ports are composed of different port coherency groups.

The above-described configuration method (and/or port mapping information) may be configured/indicated by the base station to the terminal.

In describing the present disclosure, scaling values $$\left(e.g., \frac{1}{2\sqrt{2}}, \frac{1}{4}\right)$$

for each matrix in examples related to precoding matrices are also only examples. Different value(s) may be applied to the scaling value due to parameters related to precoding matrix design (e.g., separate power scaling value, UL power control parameter, etc.) and/or factors related to power boosting/deboosting (e.g., full power mode).

In addition, a 'panel' in the present disclosure may mean a unit for distinguishing different antenna port groups (e.g., another (CB) SRS port group of (CB) SRS resource, another PUSCH port group of PUSCH, etc.) and/or different uplink resource units (e.g., an antenna port belonging to another (CB) SRS resource, etc.) constituting a single uplink resource.

Embodiments of the present disclosure are proposed based on 8Tx codebook design, but are not limited thereto. The principle described in the embodiment of the present disclosure may be applied to designing an N Tx codebook corresponding to an arbitrary natural number where N>4 (e.g., N=16, 32, 64).

Figure 10:
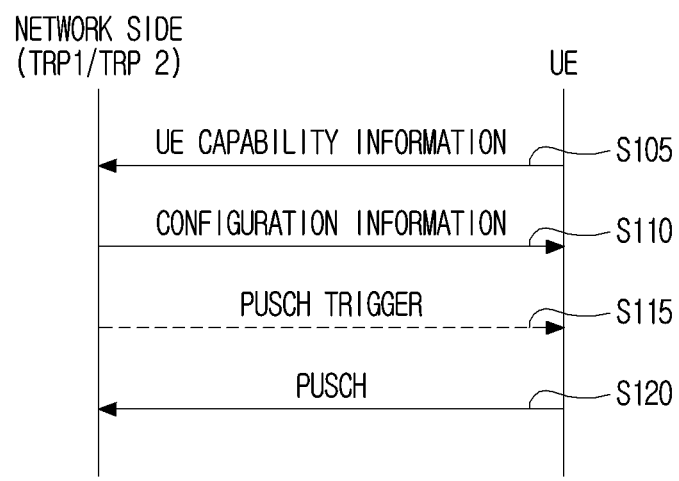
FIG. 10 is a diagram for describing a signaling process according to an embodiment of the present disclosure.

FIG. 10 is a diagram for describing a signaling procedure of a network side and a UE according to an embodiment of the present disclosure.

FIG. 10 illustrates an example (e.g., a combination of one or more of embodiment 1, embodiment 1-1, embodiment 1-2, embodiment 1-3 or detailed examples thereof) of signaling between a network side and a UE in an M-TRP situation to which the examples of the present disclosure described above may be applied.

Here, the UE/network side is exemplary and may be applied to various devices as described with reference to FIG. 11. FIG. 10 is for convenience of description and does not limit the scope of the present disclosure. In addition, some step(s) shown in FIG. 10 may be omitted depending on circumstances and/or settings. In addition, in the operation of the network side/UE of FIG. 10, the above-described uplink transmission/reception operation, M-TRP related operation, etc. may be referred to or used.

In the following description, the network side may be one base station including a plurality of TRPs, or may be one cell including a plurality of TRPs. Alternatively, the network side may include a plurality of remote radio heads (RRHs)/remote radio units (RRUs).

For example, an ideal/non-ideal backhaul may be established between TRP 1 and TRP 2 constituting the network side. In addition, although the following description is based on a plurality of TRPs, this may be equally extended and applied to transmission through a plurality of panels/cells, and may also be extended and applied to transmission through a plurality of RRHs/RRUs.

In addition, although it is described based on "TRP" in the following description, as described above, "TRP" may be replaced with expressions such as a panel, an antenna array, a cell (e.g., macro cell/small cell/pico cell, etc.), TP (transmission point), base station (gNB, etc.) and may be applied. As described above, TRPs may be classified according to information (e.g., CORESET index, ID) on the CORESET group (or CORESET pool).

For example, when one UE is configured to transmit/receive with multiple TRPs (or cells), this may mean that multiple CORESET groups (or CORESET pools) are configured for one UE. Configuration of such a CORESET group (or CORESET pool) may be performed through higher layer signaling (e.g., RRC signaling, etc.).

In addition, a base station may mean a generic term for an object that transmits and receives data with a UE. For example, the base station may be a concept including one or more transmission points (TPs), one or more transmission and reception points (TRPs), and the like. Also, the TP and/or the TRP may include a panel of a base station, a transmission and reception unit, and the like.

The UE may transmit UE capability information to the network side (S105). For example, the UE capability information may include report information on the maximum number of (CB-based SRS/PUSCH) ports supported by the UE and the number (rank) of uplink transport layers. The value of the corresponding UE capability information may include 'number of ports=8' (or more) and/or the number of uplink transport layers 5 (or more).

In particular, in relation to the report, the UE supporting 'number of ports=8' may utilize the method of embodiment 1 and/or embodiment 1-1 (e.g., report one of the 4-step UE capability values related to the codebook).

For example, the above-described operation of transmitting UE capability information from the UE (100 or 200 in FIG. 11) to the network side (200 or 100 of FIG. 11) in step S105 may be implemented by the device of FIG. 11 to be described below. For example, referring to FIG. 11, one or more processors 102 may control one or more transceivers 106 and/or one or more memories 104 to receive the UE capability information, and one or more transceivers 106 may receive the UE capability information from the network side.

The UE may receive configuration information from the network side (S110).

For example, the configuration information may include information related to network-side configuration (i.e., TRP configuration), resource allocation information related to transmission and reception based on M-TRP, and the like. The configuration information may be transmitted through higher layers (e.g., RRC, MAC CE). The configuration information may include information related to uplink transmission based on a configured grant (CG). In addition, when the configuration information is defined or configured in advance, the corresponding step may be omitted.

As another example, the configuration information may include a CBSR-related configuration indicator based on a codebook according to an embodiment of the present disclosure (e.g., embodiment 1, embodiment 1-1, embodiment 1-2, and/or embodiment 1-3). For example, an indicator for the 4-step CBSR described in Embodiment 1-2 may be configured by configuration information. As another example, an indicator for the 3-step CBSR described in Embodiments 1-3 may be configured by configuration information.

The configuration information may be configured for the UE through at least one of an RRC message, MAC-CE message, or DCI. The configuration information may be configured in the form of an existing information element (IE) and/or field, or may be configured in the form of a newly defined IE and/or newly defined field.

For example, the above-described operation of receiving configuration information from the network side (200 or 100 in FIG. 11) by the UE (100 or 200 in FIG. 11) in step S110 may be implemented by the device of FIG. 11 to be described below. For example, referring to FIG. 11, one or more processors 102 may control one or more transceivers 106 and/or one or more memories 104 to receive the configuration information and one or more transceivers 106 may receive the configuration information from the network side.

The UE may receive a CB PUSCH transmission indication from the base station (S115). In the case of a dynamic grant PUSCH, the corresponding indication may be received through DCI. As another example, in the case of a configured grant PUSCH, the corresponding indication may be received through RRC and/or DCI, and the corresponding indication may include a TPMI/TRI (/SRI) value.

In the case of 8 Tx (i.e., when the number of CB SRS ports corresponds to 8), TPMI/TRI may be indicated based on a codebook to which an embodiment (e.g., embodiment 1, embodiment 1-1, embodiment 1-2, embodiment 1-3) of the present disclosure is applied.

For example, the above-described operation of receiving a CB PUSCH transmission indication from the network side (200 or 100 in FIG. 11) by the UE (100 or 200 in FIG. 11) in step S115 may be implemented by the device of FIG. 11 to be described below. For example, referring to FIG. 11, one or more processors 102 may control one or more transceivers 106 and/or one or more memories 104 to receive the CB PUSCH transmission indication, and one or more transceivers 106 may receive the reporting triggering/activation indication from the network side.

General Device to Which the Present Disclosure May be Applied

Figure 11:
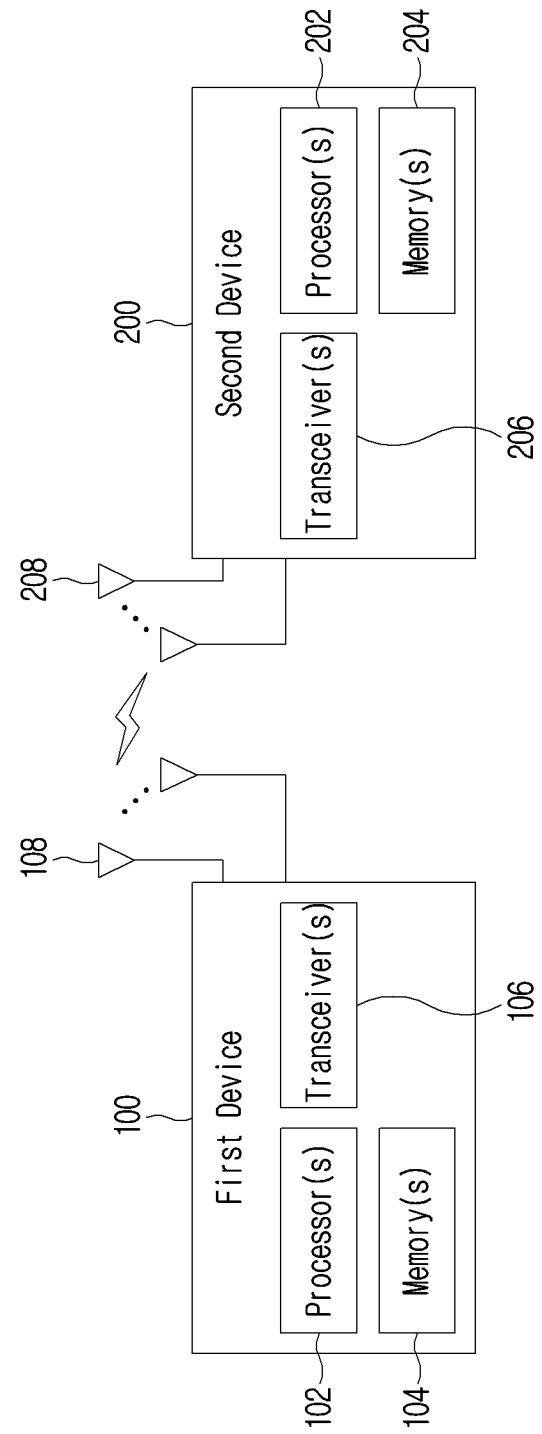
FIG. 11 is a diagram illustrating a block configuration of a wireless communication device according to an embodiment of the present disclosure.

FIG. 11 is a diagram which illustrates a block diagram of a wireless communication system according to an embodiment of the present disclosure.

In reference to FIG. 11, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
    transmitting, by a user equipment (UE) to a base station, capability information related to whether a codebook-based 8 transmission (Tx) physical uplink shared channel (PUSCH) is supported by the UE;
    receiving, by the UE from the base station, configuration information related to a codebook and a number of antenna port groups for the codebook-based 8 Tx PUSCH, based on the capability information; and
    performing, by the UE, the codebook-based 8 Tx PUSCH transmission based on the configuration information,
    wherein the capability information includes i) a maximum number of PUSCH layers for the codebook-based 8 Tx PUSCH, ii) information related to sounding reference signal (SRS) 8 Tx ports and iii) information related to whether at least one of a first type of a codebook for the codebook-based 8 Tx PUSCH, a second type of a codebook for the codebook-based 8 Tx PUSCH, a third type of a codebook for the codebook-based 8 Tx PUSCH and a fourth type of a codebook for the codebook-based 8 Tx PUSCH is supported,
    wherein the second type of a codebook includes at least one first precoding matrix having four zeros and four non-zero values per each column,
    wherein the third type of a codebook includes at least one second precoding matrix having six zeros and two non-zero values for each column, and
    wherein the fourth type of a codebook includes the at least one first precoding matrix, the at least one second precoding matrix, and at least one third precoding matrix having eight non-zero values for each column.

2. The method of claim 1, wherein:
    the first type of a codebook includes the at least one fourth precoding matrix having seven zeros and one non-zero value per each column.

3. The method of claim 2, wherein:
    the capability information includes information related to a SRS resource.

4. The method of claim 1, wherein:
    based on the third type of a codebook being supported by the UE, the configuration information includes information related to 4 port groups for the third type of a codebook.

5. The method of claim 1, wherein:
    based on the second type of a codebook being supported by the UE, the configuration information includes information related to 2 port groups for the second type of a codebook.

6. The method of claim 2, wherein:
    based on a specific full power transmission mode being configured for the UE, the codebook-based 8 Tx PUSCH transmission is performed based on the at least one first precoding matrix, the at least one second precoding matrix, the at least one third precoding matrix, or the at least one fourth precoding matrix.

7. The method of claim 2, wherein:
    based on downlink control information (DCI) being received from the base station, the codebook-based 8 Tx PUSCH transmission is performed based on the DCI and the configuration information, and
    the DCI includes information indicating an index of a specific precoding matrix among the at least one first precoding matrix, the at least one second precoding matrix, at least one third precoding matrix, or the at least one fourth precoding matrix.

8. A user equipment (UE) comprising:
    at least one transceiver; and
    at least one processor coupled to the at least one transceiver,
    wherein the at least one processor is configured to:
    transmit, through the at least one transceiver, capability information related to whether a codebook-based 8 transmission (Tx) physical uplink shared channel (PUSCH) is supported by the UE to a base station;
    receive, through the at least one transceiver, configuration information related to a codebook and a number of antenna port groups for the codebook-based 8 Tx PUSCH from the base station, based on the capability information; and
    perform the codebook-based 8 Tx PUSCH transmission based on the configuration information,
    wherein the capability information includes i) a maximum number of PUSCH layers for the codebook-based 8 Tx PUSCH, ii) information related to sounding reference signal (SRS) 8 Tx ports and iii) information related to whether at least one of a first type of a codebook for the codebook-based 8 Tx PUSCH, a second type of a codebook for the codebook-based 8 Tx PUSCH, a third type of a codebook for the codebook-based 8 Tx PUSCH and a fourth type of a codebook for the codebook-based 8 Tx PUSCH is supported,
    wherein the second type of a codebook includes at least one first precoding matrix having four zeros and four non-zero values per each column,
    wherein the third type of a codebook includes at least one second precoding matrix having six zeros and two non-zero values for each column, and
    wherein the fourth type of a codebook includes the at least one first precoding matrix, the at least one second precoding matrix, and at least one third precoding matrix having eight non-zero values for each column.

9. A base station comprising:
    at least one transceiver; and
    at least one processor coupled to the at least one transceiver,
    wherein the at least one processor is configured to:
    receive, through the at least one transceiver, capability information related to whether a codebook-based 8 transmission (Tx) physical uplink shared channel (PUSCH) is supported by the UE from the UE,
    transmit, through the at least one transceiver, configuration information related to a codebook and a number of antenna port groups for the codebook-based 8 Tx PUSCH to the UE, based on the capability information; and
    perform the codebook-based 8 Tx PUSCH reception based on the configuration information, wherein the capability information includes i) a maximum number of PUSCH layers for the codebook-based 8 Tx PUSCH, ii) information related to sounding reference signal (SRS) 8 Tx ports and iii) information related to whether at least one of a first type of a codebook for the codebook-based 8 Tx PUSCH, a second type of a codebook for the codebook-based 8 Tx PUSCH, a third type of a codebook for the codebook-based 8 Tx PUSCH and a fourth type of a codebook for the codebook-based 8 Tx PUSCH is supported, wherein the second type of a codebook includes at least one first precoding matrix having four zeros and four non-zero values per each column, wherein the third type of a codebook includes at least one second precoding matrix having six zeros and two non-zero values for each column, and wherein the fourth type of a codebook includes the at least one first precoding matrix, the at least one second precoding matrix, and at least one third precoding matrix having eight non-zero values for each column.

* * * * *